(12) United States Patent
Yu et al.

(10) Patent No.: US 11,435,465 B2
(45) Date of Patent: Sep. 6, 2022

(54) VEHICLE RADAR DEVICE AND SYSTEM THEREOF

(71) Applicants: CUB ELECPARTS INC., Changhua County (TW); CUBTEK INC., Hsinchu County (TW)

(72) Inventors: San-Chuan Yu, Changhua County (TW); Yuan-Tung Hung, Changhua County (TW); Ya-Ling Chi, Changhua County (TW); Cheng-Hsin Li, Changhua County (TW); Zheng-Wei Ke, Changhua County (TW); Wei-Shun Shih, Changhua County (TW)

(73) Assignees: CUB ELECPARTS INC., Changhua County (TW); CUBTEK INC., Hsinchu County (TW)

( * ) Notice: Subject to any disclaimer, the term of this patent is extended or adjusted under 35 U.S.C. 154(b) by 161 days.

(21) Appl. No.: 16/897,262

(22) Filed: Jun. 9, 2020

(65) Prior Publication Data

US 2021/0063557 A1     Mar. 4, 2021

(30) Foreign Application Priority Data

Sep. 2, 2019   (TW) ................. 108131559

(51) Int. Cl.
   *G01S 13/06*      (2006.01)
   *B60R 11/02*      (2006.01)
   (Continued)

(52) U.S. Cl.
   CPC .............. *G01S 13/06* (2013.01); *B60R 11/02* (2013.01); *G01S 7/03* (2013.01); *G01S 13/931* (2013.01);
   (Continued)

(58) Field of Classification Search
   CPC .......... G01S 7/03; G01S 7/032; G01S 13/931; H01Q 1/3233; H01Q 1/42; H01Q 1/428; H01Q 21/00; H01Q 21/061
   See application file for complete search history.

(56) References Cited

U.S. PATENT DOCUMENTS

| 4,189,731 A | * | 2/1980 | Rope ...................... H01Q 1/42 |
| | | | 343/756 |
| 5,173,706 A | * | 12/1992 | Urkowitz ................ G01S 7/032 |
| | | | 342/39 |

(Continued)

FOREIGN PATENT DOCUMENTS

| JP | 2016-205821 A | 12/2016 |
| TW | 201441645 A | 11/2014 |

(Continued)

*Primary Examiner* — Peter M Bythrow
(74) *Attorney, Agent, or Firm* — CKC & Partners Co., LLC

(57) ABSTRACT

A vehicle radar device includes a first antenna unit, a second antenna unit, at least one computing unit and at least one circuit board. The first antenna unit and the second antenna unit are communicatively connected to the at least one computing unit. The at least one circuit board includes a first board portion and a second board portion. The first antenna unit is a circuit board type and disposed on the first board portion. The second antenna unit is a circuit board type and disposed on the second board portion. The at least one computing unit disposed on at least one of the first board portion and the second board portion. When an angle between the first board portion and the second board portion is P12, and the following condition is satisfied: 80degrees ≤P12≤130 degrees.

17 Claims, 19 Drawing Sheets

(51) Int. Cl.
  *G01S 7/03* (2006.01)
  *G01S 13/931* (2020.01)
  *H01Q 1/32* (2006.01)
  *H01Q 1/42* (2006.01)
  *B60R 11/00* (2006.01)

(52) U.S. Cl.
  CPC ............. *H01Q 1/3233* (2013.01); *H01Q 1/42* (2013.01); *B60R 2011/004* (2013.01)

(56) References Cited

U.S. PATENT DOCUMENTS

| | | | | |
|---|---|---|---|---|
| 7,663,533 | B2* | 2/2010 | Toennesen | H01Q 25/002 342/70 |
| 9,400,328 | B2* | 7/2016 | Hsiao | G01S 13/87 |
| 10,173,623 | B1 | 1/2019 | Meksavan et al. | |
| 10,336,253 | B1* | 7/2019 | Hsu | B60W 30/18145 |
| 2010/0097264 | A1* | 4/2010 | Kawasaki | H01Q 1/42 342/70 |
| 2011/0080313 | A1* | 4/2011 | Wintermantel | G01S 7/0233 342/175 |
| 2011/0163909 | A1* | 7/2011 | Jeong | H01Q 21/08 342/374 |
| 2012/0194377 | A1* | 8/2012 | Yukumatsu | G01S 13/0209 342/368 |
| 2013/0207879 | A1* | 8/2013 | Rada | H01Q 21/08 29/601 |
| 2014/0306846 | A1* | 10/2014 | Nakatsu | H01Q 21/29 343/700 MS |
| 2014/0313067 | A1* | 10/2014 | Hsiao | G01S 13/87 342/27 |
| 2016/0142596 | A1* | 5/2016 | DePaschoal | H04N 5/2252 348/38 |
| 2017/0104267 | A1* | 4/2017 | Powell | H01Q 21/065 |
| 2017/0242121 | A1* | 8/2017 | Tanaka | G01S 13/931 |
| 2018/0034166 | A1* | 2/2018 | Hinman | H01Q 5/307 |
| 2018/0175495 | A1* | 6/2018 | Bennett | G01S 13/87 |
| 2018/0275269 | A1* | 9/2018 | Lind | B65B 1/04 |
| 2019/0152392 | A1* | 5/2019 | DePaschoal | H04N 13/344 |
| 2019/0302227 | A1* | 10/2019 | Shiozaki | H01Q 25/00 |
| 2020/0355814 | A1* | 11/2020 | Tsai | H01Q 19/17 |
| 2020/0386855 | A1* | 12/2020 | Bialer | G01S 7/2813 |

FOREIGN PATENT DOCUMENTS

| | | |
|---|---|---|
| TW | M578884 U | 6/2019 |
| TW | I667889 B | 8/2019 |

* cited by examiner

4810a

4810a

VEHICLE RADAR DEVICE AND SYSTEM THEREOF

RELATED APPLICATIONS

This application claims priority to Taiwan Application Ser. No. 108131559, filed Sep. 2, 2019, which is herein incorporated by reference.

BACKGROUND

Technical Field

The present disclosure relates to a vehicle radar device and system. More particularly, the present disclosure relates to a vehicle radar device and system both including two antenna units.

Description of Related Art

With the rapid developments of advanced driver assistance system (ADAS) and autopilot technology, the application requirements of the vehicle radar devices are more and more.

With respect to the vehicles with more than four wheels, especially large vehicles, such as bus and truck, the blind spot is the area below the driving seat, rear side of the vehicle, and the left and right side of the vehicle. When large vehicles turn, the rear wheels will shift to the turning side which is called radius difference between inner wheels, it pose a great threat to the people and vehicles on the turning side of the large vehicles, the risk of turn right (turn to the other side of the driving seat) is the highest. Not easy to accelerate and decelerate is a feature of large vehicles. Thus, it may lead to brake too late and run a red light or amber light, it is easily to result in traffic accidents. Moreover, large vehicles may form a strong air current and shake other vehicles around them, and the dust they blow may affect other vehicles' safety while driving at high speed. Therefore, areas around the large vehicles are dangerous.

Because of the above two factors of the large vehicles, wide area of the blind spot and radius difference between inner wheels, pedestrian or other vehicles can't keep away from high risk just by remind like propagate. In large vehicles, the accident incidence rate of bus is higher because the bus is heavy when there are many passengers and it may cause the bus too late to aware of the situation after hitting other cars. Currently, we can only propagating cars, bikes and pedestrians to keep away from large vehicles while passing through the road and keep a bigger distance from large vehicles while large vehicles are turning in order to ensure road safety.

Therefore, there is an urgent need for a solution of a vehicle radar device which is featured with effectively detected the object all around by vehicles their selves, especially large vehicles, in order to prevent the car accident caused by blind spot and radius difference between inner wheels, in today's market.

SUMMARY

According to one embodiment of the present disclosure, a vehicle radar device includes a first antenna unit, a second antenna unit, at least one computing unit and at least one circuit board. The first antenna unit and the second antenna unit are communicatively connected to the at least one computing unit. The at least one circuit board includes a first board portion and a second board portion. The first antenna unit is a circuit board type and disposed on the first board portion. The second antenna unit is a circuit board type and disposed on the second board portion. The at least one computing unit disposed on at least one of the first board portion and the second board portion. When an angle between the first board portion and the second board portion is P12, the following condition is satisfied: 80 degrees≤P12≤130 degrees.

According to another embodiment of the present disclosure, a vehicle radar system is disposed in a vehicle and includes at least one vehicle radar device. The at least one vehicle radar device is disposed on at least one side of a left side and a right side of the vehicle. The vehicle radar device includes a first antenna unit, a second antenna unit, at least one computing unit and at least one circuit board. The first antenna unit and the second antenna unit are communicatively connected to the at least one computing unit. The at least one circuit board includes a first board portion and a second board portion. The first board portion and the second board portion are vertical to a horizontal plane of the vehicle. The first antenna unit is a circuit board type and disposed on the first board portion. The second antenna unit is a circuit board type and disposed on the second board portion. The at least one computing unit disposed on at least one of the first board portion and the second board portion. When an angle between the first board portion and the second board portion is P12, the following condition is satisfied: 80 degrees≤P12≤130 degrees.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiments, the practical details is unnecessary. In addition, for simplifying the drawings, some conventional structures and elements will be simply illustrated, and repeated elements may be represented by the same labels.

Figure 1A:
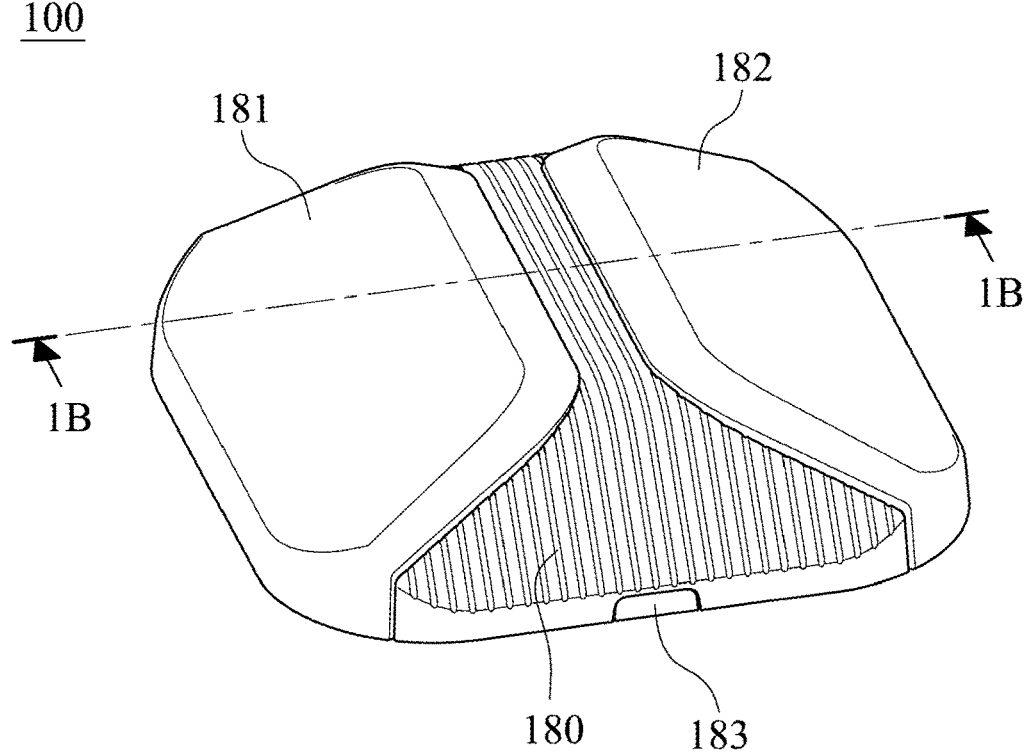
FIG. 1A is a schematic view of a vehicle radar device according to the 1st embodiment of the present disclosure.
Figure 1B:
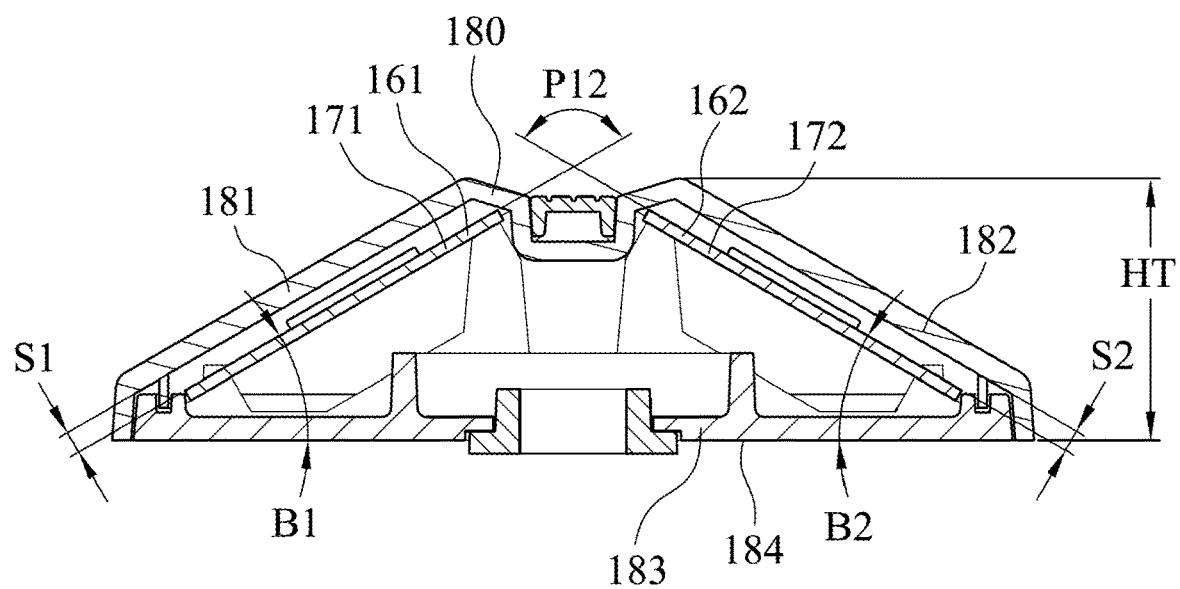
FIG. 1B is a cross-sectional view along line 1B-1B of FIG. 1A.
Figure 1C:
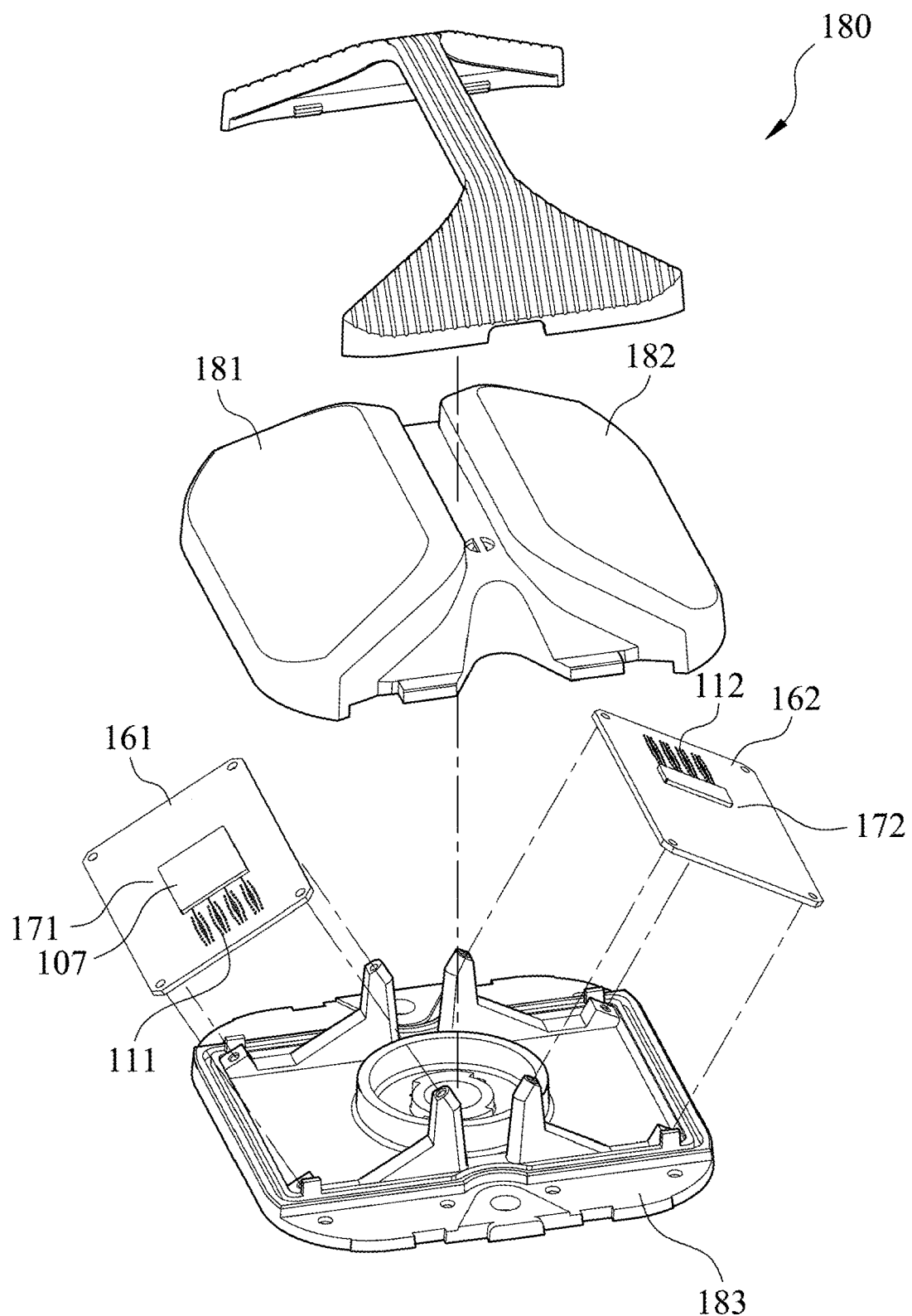
FIG. 1C is an exploded view of the vehicle radar device according to the 1st embodiment.
Figure 1D:
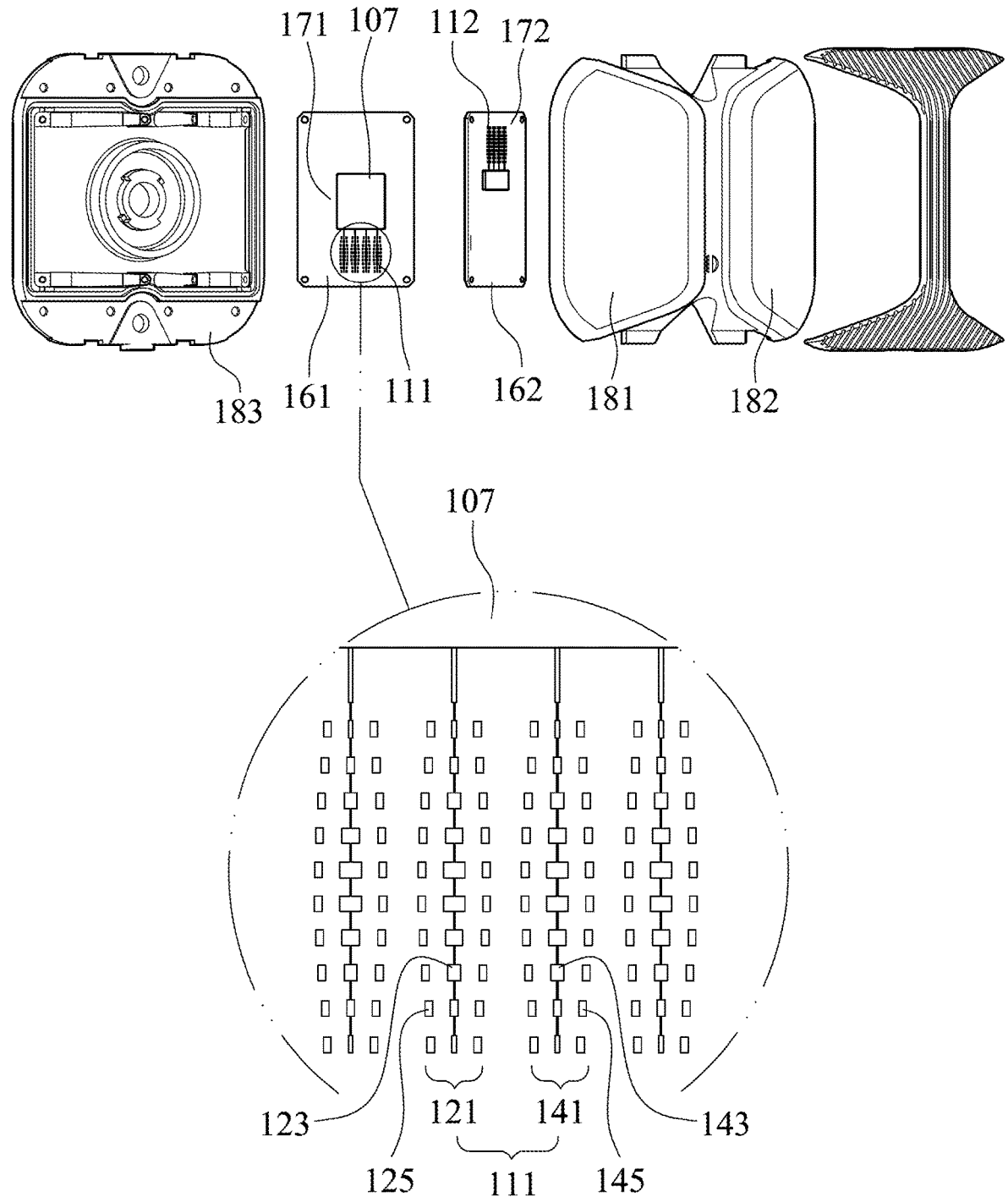
FIG. 1D is another exploded view of the vehicle radar device according to the 1st embodiment.
Figure 1E:
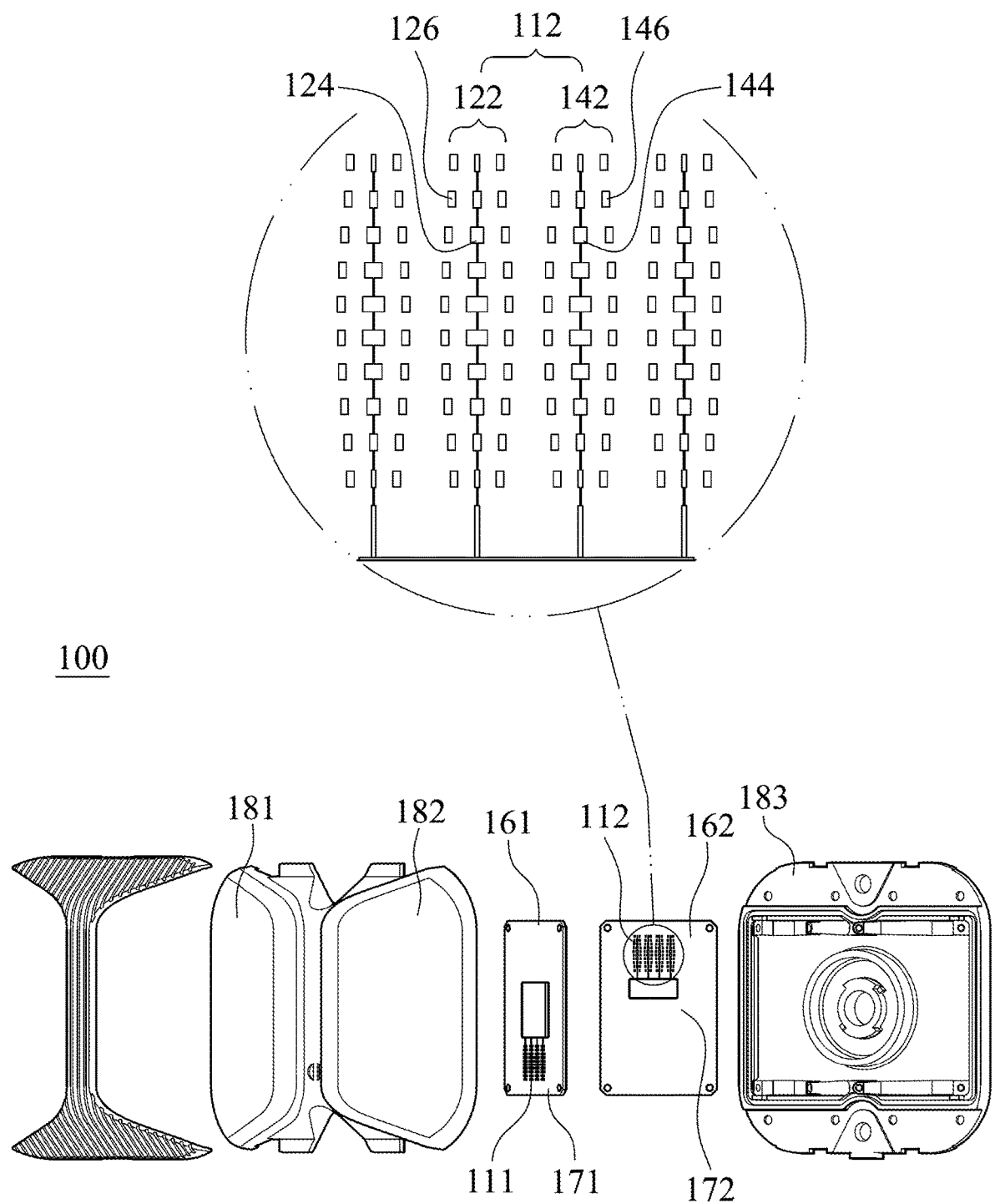
FIG. 1E is further another exploded view of the vehicle radar device according to the 1st embodiment.

FIG. 1A is a schematic view of a vehicle radar device 100 according to the 1st embodiment of the present disclosure. FIG. 1B is a cross-sectional view along line 1B-1B of FIG. 1A. FIG. 1C is an exploded view of the vehicle radar device 100 according to the 1st embodiment. FIG. 1D is an exploded view of the vehicle radar device 100 which faces a first board portion 171 according to the 1st embodiment. FIG. 1E is an exploded view of the vehicle radar device 100 which faces a second board portion 172 according to the 1st embodiment. It should be mentioned that in the drawings of the 1st embodiment, the assembled or the fixed elements and detailed elements on circuit boards 161, 162 are omitted. In FIG. 1A to FIG. 1E, the vehicle radar device 100 includes a first antenna unit 111, a second antenna unit 112, a computing unit 107, and the circuit boards 161, 162.

The first antenna unit 111 and the second antenna unit 112 are communicatively connected to the computing unit 107, wherein the computing unit 107 can include a processing element and a storing element. Each of the circuit boards 161, 162 includes a first board portion 171 and a second board portion 172. The first antenna unit 111 is a circuit board type and disposed on the first board portion 171. The second antenna unit 112 is a circuit board type and disposed on the second board portion 172. In the 1st embodiment, the first board portion 171 is a part of the circuit boards 161, 162, specifically, the first board portion 171 is at least one part of the circuit board 161. The second board portion 172 is a part of the circuit boards 161, 162, specifically, the second board portion 172 is at least one part of the circuit board 162. The computing unit 107 is disposed on the first board portion 171 (that is, one of the first board portion 171 and the second board portion 172). A plurality of radio frequency emitting elements (such as power amplifiers and filters, but is not limited thereto) and a plurality of radio frequency receiving elements (such as low noise amplifiers and filters, but is not limited thereto) are couple between the first antenna unit 111 and the computing unit 107. The radio frequency emitting elements, the radio frequency receiving elements and the computing unit 107 are disposed in a shielding cover. In other embodiments according to the present disclosure, each of the first board portion and the second board portion can be two parts on the same circuit board.

In FIG. 1B, an angle between the first board portion 171 and the second board portion 172 is P12, the following condition is satisfied: 80 degrees≤P12≤130 degrees. Thus, the first antenna unit 111 and the second antenna unit 112 are two non-coplanar antenna arrays, and a wider detection angle and range can be provided by applying to single device (that is, the vehicle radar device 100). Further, the condition of the aforementioned parameter P12 of the vehicle radar device 100 is satisfied which is favorable for effectively reducing the detecting blind spot between the first board portion 171 and the second board portion 172, and the vehicle radar device 100 can also achieve a compact size. In the 1st embodiment, P12 is 120 degrees.

In the 1st embodiment, the vehicle radar device 100 can further include a housing 180, wherein the first antenna unit 111, the second antenna unit 112, the computing unit 107 and the circuit boards 161, 162 are all disposed in the housing 180.

The housing 180 includes a bottom 183. An angle between the first board portion 171 and an outer surface 184 of the bottom 183 is B1, an angle between the second board portion 172 and the outer surface 184 of the bottom 183 is B2, the following conditions are satisfied: 25 degrees≤B1≤50 degrees; and 25 degrees≤B2≤50 degrees. Thus, it is favorable for directly attaching the bottom 183 to the outer surface of the vehicle body so as to simplify the step of assembling the vehicle radar device 100 on the vehicle body, and also maintain the predicted detecting angle and range. In the 1st embodiment, B1 is 30 degrees and B2 is 30 degrees.

A thickness from an outer surface 184 of the bottom 183 of the vehicle radar device 100 is HT, the following condition is satisfied: 15 mm HT 50 mm. In general, the vehicle radar device 100 is not suitable for assembling inside the vehicle body due to most of the vehicle bodies of the large vehicles are made of metal. Thus, the vehicle radar device 100 of the present disclosure can be assembled on the outer surface of the vehicle body but not to be too protruding therefrom (such as, shorter than the thickness of a bumper) so as to satisfy the related regulations. Further, when the aforementioned conditions of the parameters P12 or B1, B2 are satisfied, and the aforementioned condition of the thickness HT is also satisfied, it still has a sufficient detecting angle and range. In the 1st embodiment, the thickness HT is about 29.9 mm.

The housing 180 can further include two covering members, that is, the covering members 181, 182. A thickness of entire covering member 181 is substantially identical, and a thickness of entire covering member 182 is substantially identical. Thus, the situation of the uneven thickness because of the inevitable manufacturing tolerance can be eliminated. The first board portion 171 (the location of the signal emission source of the first antenna unit 111) is parallel to one of the covering members 181, 182 (that is, the covering member 181) and the distance therebetween is S1. The second board portion 172 (the location of the signal emission source of the second antenna unit 112) is parallel to one of the covering members 181, 182 (that is, the covering member 182) and the distance therebetween is S2. The following conditions are satisfied: 0 mm≤S1≤5 mm; and 0 mm≤S2≤5 mm. Thus, the housing 180 has a compact design and the lens effect thereof can be reduced so as to avoid focusing or scattering the radar wave, so that the vehicle radar device 100 can obtain wide angle detecting function and anti-vibration so as to reduce the noise. Furthermore, the following condition is satisfied: 2 mm≤S1≤3 mm; and 2 mm≤S2≤3 mm. In the 1st embodiment, S1 is 2.5 mm and S2 is 2.5 mm. According to an embodiment of the present disclosure, each of the two covering members in the housing is near to the first board portion and the second board portion, the bottom of the housing is away from a side that has a shorter distance to the first board portion and the second board portion.

In other embodiments according to the present disclosure (not shown in drawings), when the vehicle radar device is applied to long range detection, the two surfaces of each of the two covering members of the housing close to and face the first board portion and the second board portion can be curved surfaces (that is, the thicknesses of entire covering members are not identical) so as to generate a lens effect. In short, each of the covering members is similar to the "electromagnetic lens" which can change the direction of the radar wave, the surface curvature of each of the covering members is related to the permittivity of the material thereof, and the different shapes of the covering members (such as the shape of electromagnetic lens) may generate different phases of electric field. Moreover, when the outer surface of each of the covering members is convex, the dust and rain attached to the outer surface of each of the covering members can be blown away along the curved shape of the outer surface easily by the air flow generated by the movement of the vehicle, and the characteristic of the electromagnetic lens can be maintained, that is, the surface curvature or length of a path of the radar wave will not be effected by dust and rain.

In FIG. 1D and FIG. 1E, a number of the computing unit 107 is one, the first antenna unit 111 and the second antenna unit 112 are communicatively connected to the computing unit 107, the computing unit 107 is disposed on the first board portion 171. In detail, the circuit boards 161, 162 can be electrically connected to each other by at least one of a flexible printed circuit board, another circuit board, a connector and a cable (but is not limited thereto), and the second antenna unit 112 disposed on the circuit board 162 is communicatively connected to the computing unit 107 disposed on the circuit board 161. Thus, it is favorable for the miniaturization of the vehicle radar device 100 and effectively integrating the transmitting signals and the receiving signals of the first antenna unit 111 and the second antenna unit 112.

In other embodiments according to the present disclosure (not shown in drawings), a number of the computing unit of the vehicle radar device can be two, each of the first antenna unit and the second antenna unit is communicatively connected to the two computing units. Each of the two computing units is disposed on the first board portion and the second board portion. Thus, it is favorable for the flexibility and the convenience to the design of the vehicle radar device. Furthermore, the aforementioned two computing units can be communicatively connected to a vehicle control unit of the vehicle or one of the aforementioned two computing units is communicatively connected to the vehicle control unit of the vehicle via the other one of the aforementioned two computing units.

In the 1st embodiment, a number of the circuit board of the vehicle radar device 100 is two, that is, the circuit boards 161, 162. The first board portion 171 and the second board portion 172 are disposed on the circuit board 161 and the circuit board 162, respectively. Thus, it is favorable for applying the circuit boards 161, 162 and related elements of multiple vehicle radar devices with different values of the angle P12 directly.

An operating frequency of the first antenna unit 111 and an operating frequency of the second antenna unit 112 may be both greater than 10 GHz. Furthermore, the operating frequency of the first antenna unit 111 and the operating frequency of the second antenna unit 112 may be both greater than 10 GHz and smaller than 300 GHz. Moreover, the operating frequency of the first antenna unit 111 and the operating frequency of the second antenna unit 112 may be both 24 GHz+/−5G Hz, 77 GHz+/−5G Hz, or 79 GHz+/−5G Hz. The first antenna unit 111 includes at least one first transmitting antenna 121 and at least one first receiving antenna 141. The second antenna unit 112 includes at least one second transmitting antenna 122 and at least one second receiving antenna 142. Thus, it is favorable for accurately detecting the object all around of the vehicle radar device 100. In the 1st embodiment, the operating frequency of the first antenna unit 111 and the operating frequency of the second antenna unit 112 are both about 79 GHz.

At least one of the first transmitting antenna 121, the first receiving antenna 141, the second transmitting antenna 122 and the second receiving antenna 142 may include patch antenna. Thus, the vehicle radar device 100 can achieve a compact size and also provide a larger detecting range. In the 1st embodiment, each of the first transmitting antenna 121, the first receiving antenna 141, the second transmitting antenna 122 and the second receiving antenna 142 includes patch antenna. According to the embodiments of the present disclosure, the patch antenna of the at least one of the first transmitting antenna, the first receiving antenna, the second transmitting antenna and the second receiving antenna can be a single patch antenna or an antenna array formed by a plurality of radiating elements in a patch type, such as series-fed patch array (SFPA), but is not limited thereto.

In detail, a number of each of the first transmitting antenna 121 and the first receiving antenna 141 is two. On the first board portion 171, each of the first transmitting antennas 121 includes a SFPA 123 and a plurality of metal pads 125 arranged on the two sides of the SFPA 123 along the direction of the aforementioned array. Each of the first receiving antennas 141 includes a SFPA 143 and a plurality of metal pads 145 arranged on the two sides of the SFPA 143 along the direction of the aforementioned array. The arrangements of the first transmitting antenna 121 and the first receiving antenna 141 are as shown in FIG. 1D, but is not limited thereto. The number of each of the second transmitting antenna 122 and the second receiving antenna 142 is two. On the second board portion 172, each of the second transmitting antennas 122 includes a SFPA 124 and a plurality of metal pads 126 arranged on the two sides of the SFPA 124 along the direction of the aforementioned array. Each of the second receiving antennas 142 includes a SFPA 144 and a plurality of metal pads 146 arranged on the two sides of the SFPA 144 along the direction of the aforementioned array. The arrangements of the second transmitting antenna 122 and the second receiving antenna 142 are as shown in FIG. 1E, but is not limited thereto. In other embodiments according to the present disclosure (not shown in drawings), the antenna type of the first antenna unit and the second antenna unit can be different in accordance with the detecting application, and not limited in the aforementioned antenna type disclosed in the present disclosure.

Moreover, the number of each of the first transmitting antenna, the first receiving antenna, the second transmitting antenna and the second receiving antenna can be different, and each of the number thereof can be one or more than three.

Figure 1F:
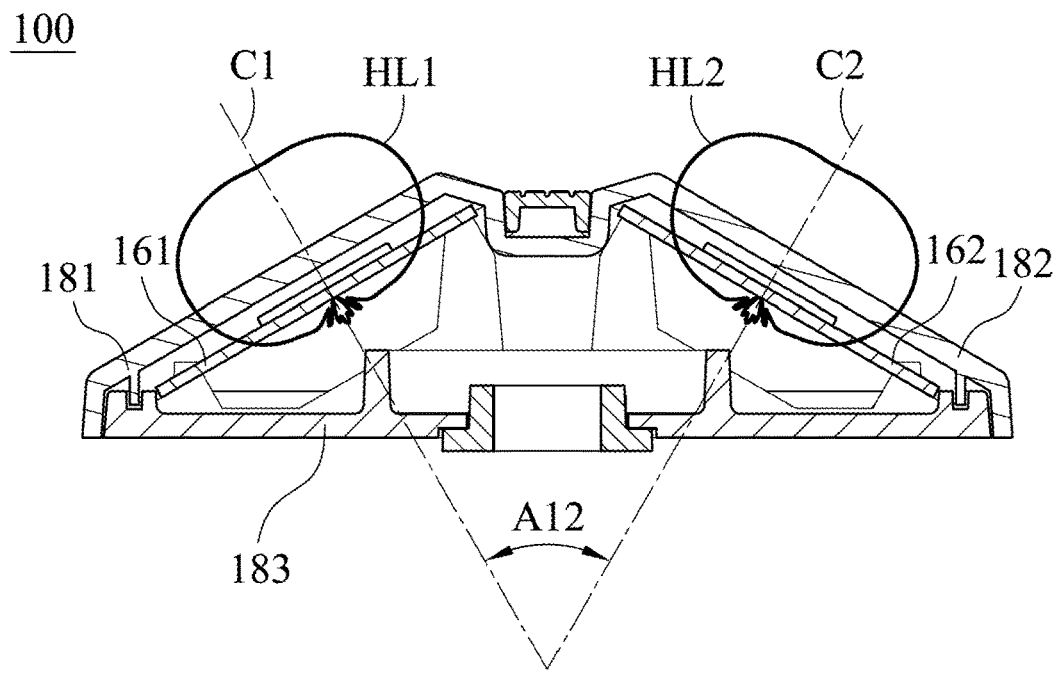
FIG. 1F is a schematic view of parameters of the vehicle radar device according to the 1st embodiment.

FIG. 1F is a schematic view of a parameter A12 of a vehicle radar device 100 according to the 1st embodiment. In FIG. 1F, main lobes HL1, HL2 are not physical structures of the vehicle radar device 100. Under the operating frequency of the first antenna unit 111 and the operating frequency of the second antenna unit 112, an angle between a centerline C1 of the main lobe HL1 of the first antenna unit 111 on a plane and a centerline C2 of the main lobe HL2 of the second antenna unit 112 on the plane is A12, and the plane is vertical to the first board portion 171, the second board portion 172 and the outer surface 184 as shown in FIG. 1F, the following condition is satisfied: 50 degrees≤A12≤100 degrees. Thus, the vehicle radar device 100 can achieve a compact size and the requirement of detecting angle and the specification of detecting range can be satisfied. In the 1st embodiment, A12 is 60 degrees.

Specifically, a direction of the centerline C1 of the main lobe HL1 of the first antenna unit 111 on the aforementioned plane is the direction of a maximum gain of a three-dimensional radiation pattern of the first antenna unit 111. A direction of the centerline C2 of the main lobe HL2 of the second antenna unit 112 on the aforementioned plane is the direction of a maximum gain of a three-dimensional radiation pattern of the second antenna unit 112. Furthermore, according to the present disclosure, the parameter A12 can be an angle between the centerline C1 of the main lobe HL1 of the first transmitting antenna 121 on the aforementioned plane and the centerline C2 of the main lobe HL2 of the second transmitting antenna 122 on the aforementioned plane, or the parameter A12 can be an angle between the centerline C1 of the main lobe HL1 of the first receiving antenna 141 on the aforementioned plane and the centerline C2 of the main lobe HL2 of the second receiving antenna 142 on the aforementioned plane.

Figure 1G:
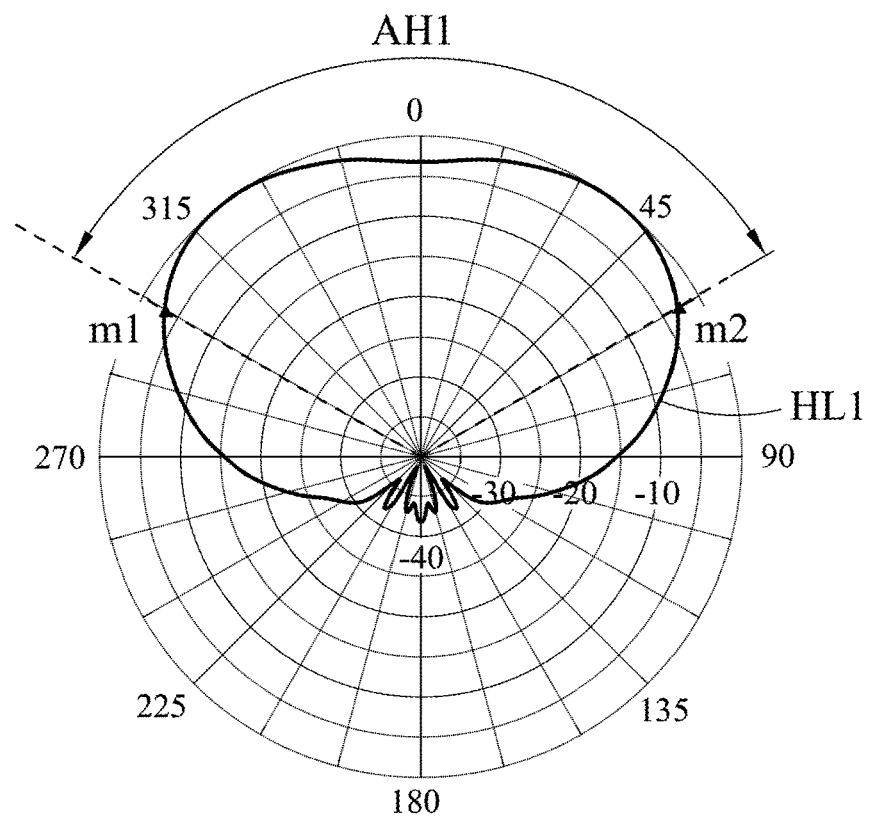
FIG. 1G is another schematic view of parameters of the vehicle radar device according to the 1st embodiment.

FIG. 1G is a schematic view of a parameter AH1 of the vehicle radar device 100, and is also a schematic view of a radiation pattern of the first antenna unit 111 on the aforementioned plane (the plane in FIG. 1F), especially is a schematic view of a radiation pattern when the polarization direction of the measuring antenna is parallel to the aforementioned plane (i.e. FIG. 1F). In detail, FIG. 1G can be a schematic view of a radiation pattern of the first transmitting antenna 121 on the aforementioned plane, FIG. 1G can also be a schematic view of a radiation pattern of the first receiving antenna 141 on the aforementioned plane, and a schematic view of a parameter AH2 in the 1st embodiment is similar to FIG. 1G. In FIG. 1G, a half power beam width (HPBW) of the main lobe HL1 of the first antenna unit 111 on the plane is AH1, which is defined by half power markers m1 and m2 in FIG. 1G, the HPBW of the main lobe HL2 of the second antenna unit 112 on the plane is AH2, and the plane is vertical to the first board portion 171, the second board portion 172 and the outer surface 184, the following conditions are satisfied: 100 degrees≤AH1≤180 degrees; and 100 degrees≤AH2≤180 degrees. Thus, the detecting angle of the vehicle radar device 100 can be more than 180 degrees, and when the vehicle radar device 100 is used as a detecting radar for inner wheels radius difference, it is favorable for providing further accurate detection for object which moves slowly in a short distance. In the 1st embodiment, AH1 is 120 degrees, AH2 is 120 degrees.

Figure 2A:
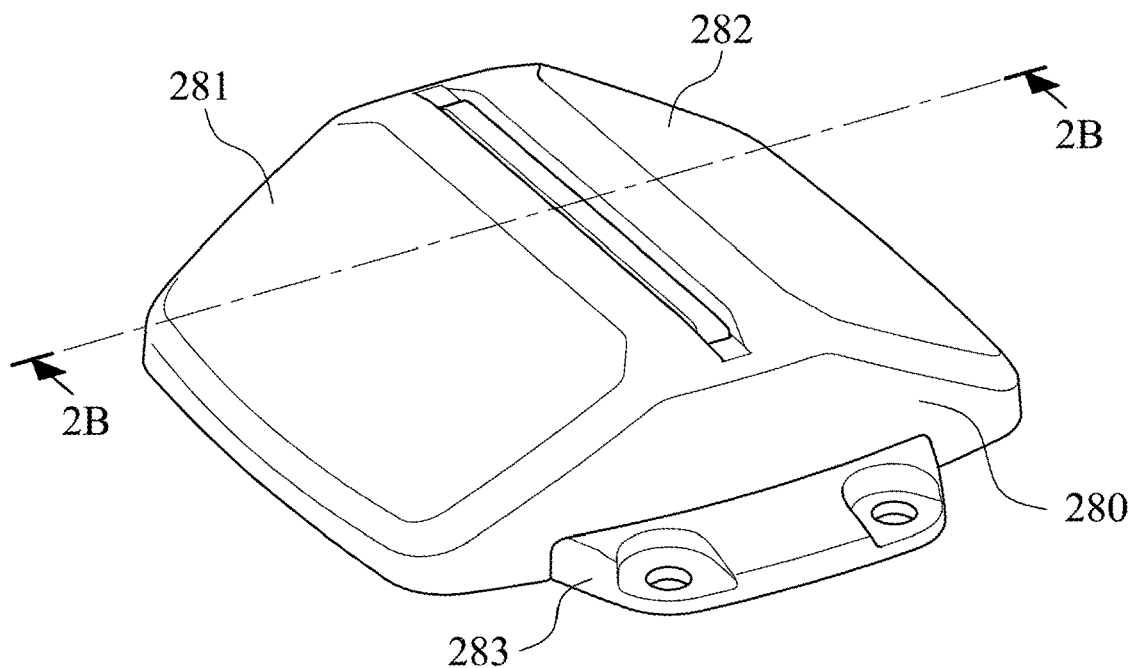
FIG. 2A is a schematic view of a vehicle radar device to the 2nd embodiment of the present disclosure.
Figure 2B:
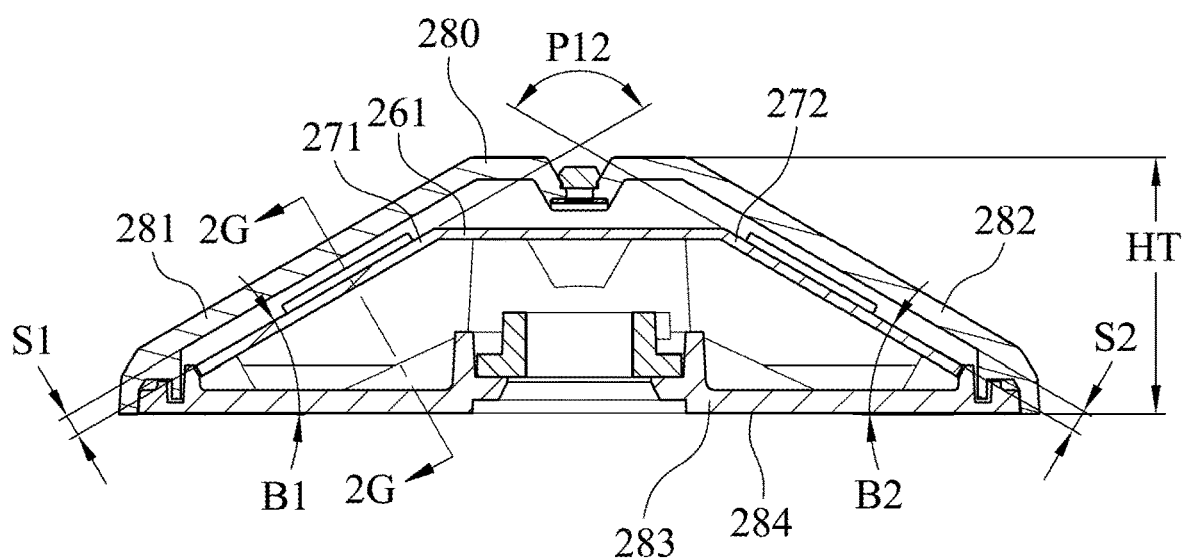
FIG. 2B is a cross-sectional view along line 2B-2B of FIG. 2A.
Figure 2C:
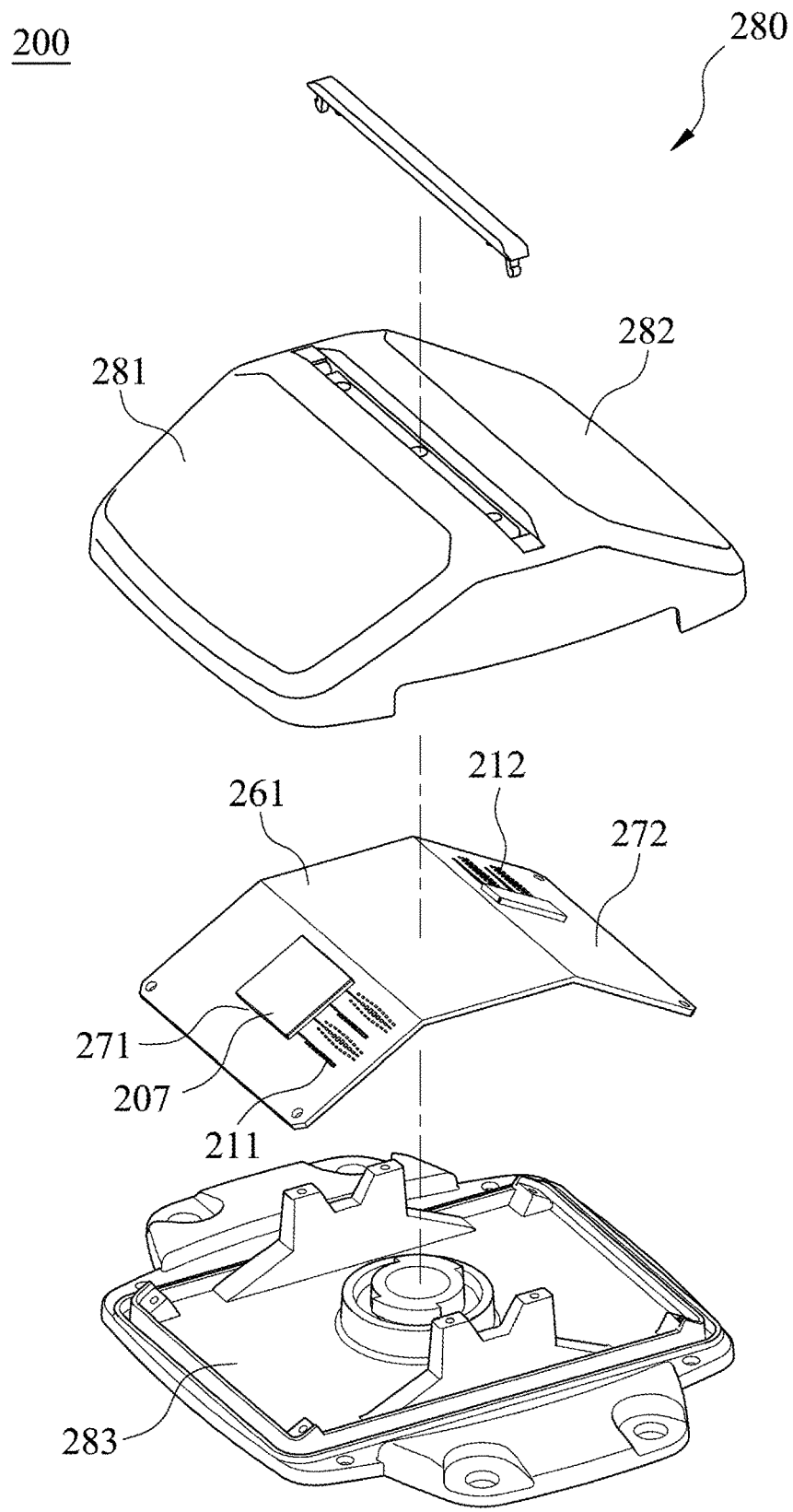
FIG. 2C is an exploded view of the vehicle radar device according to the 2nd embodiment.
Figure 2D:
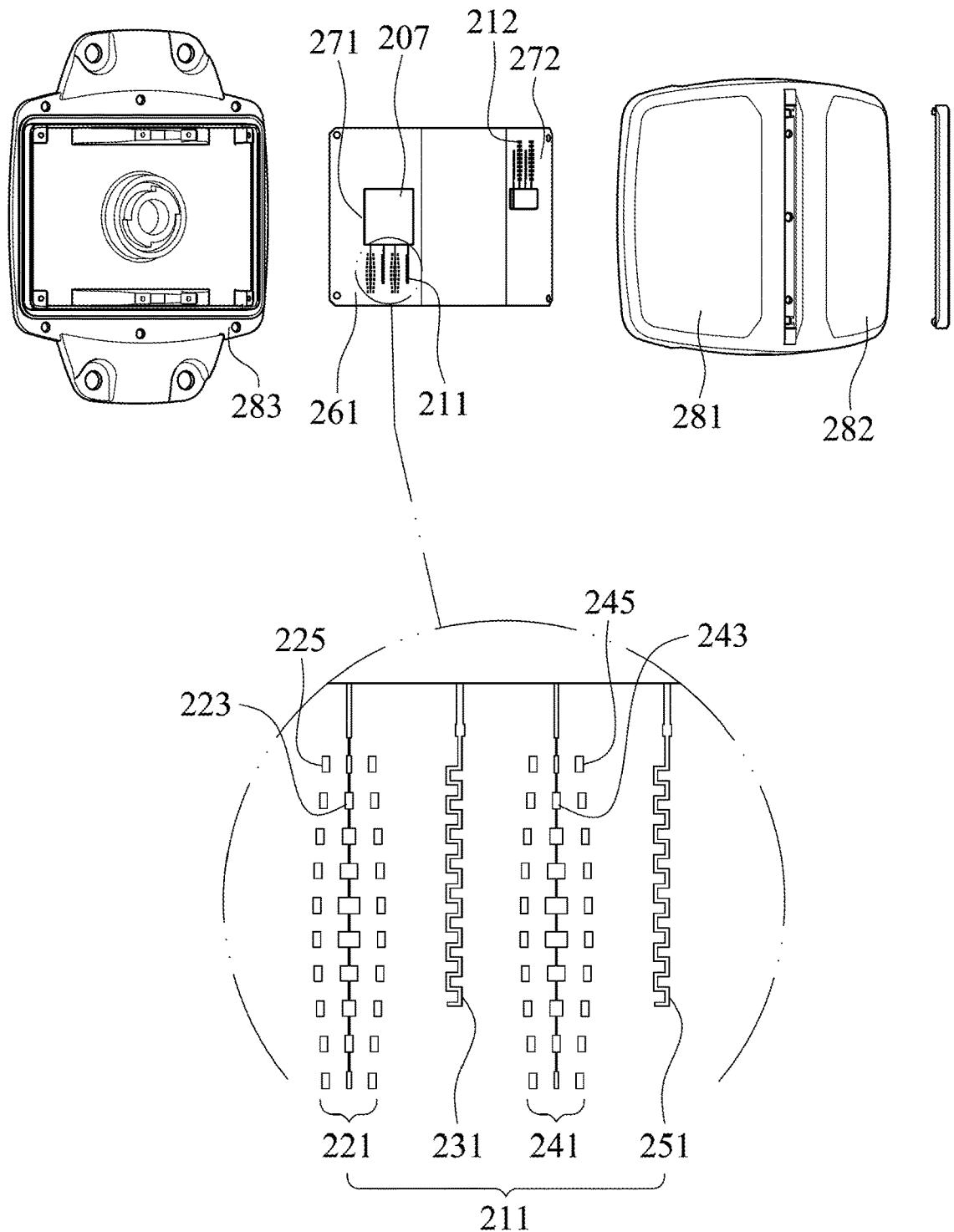
FIG. 2D is another exploded view of the vehicle radar device according to the 2nd embodiment.
Figure 2E:
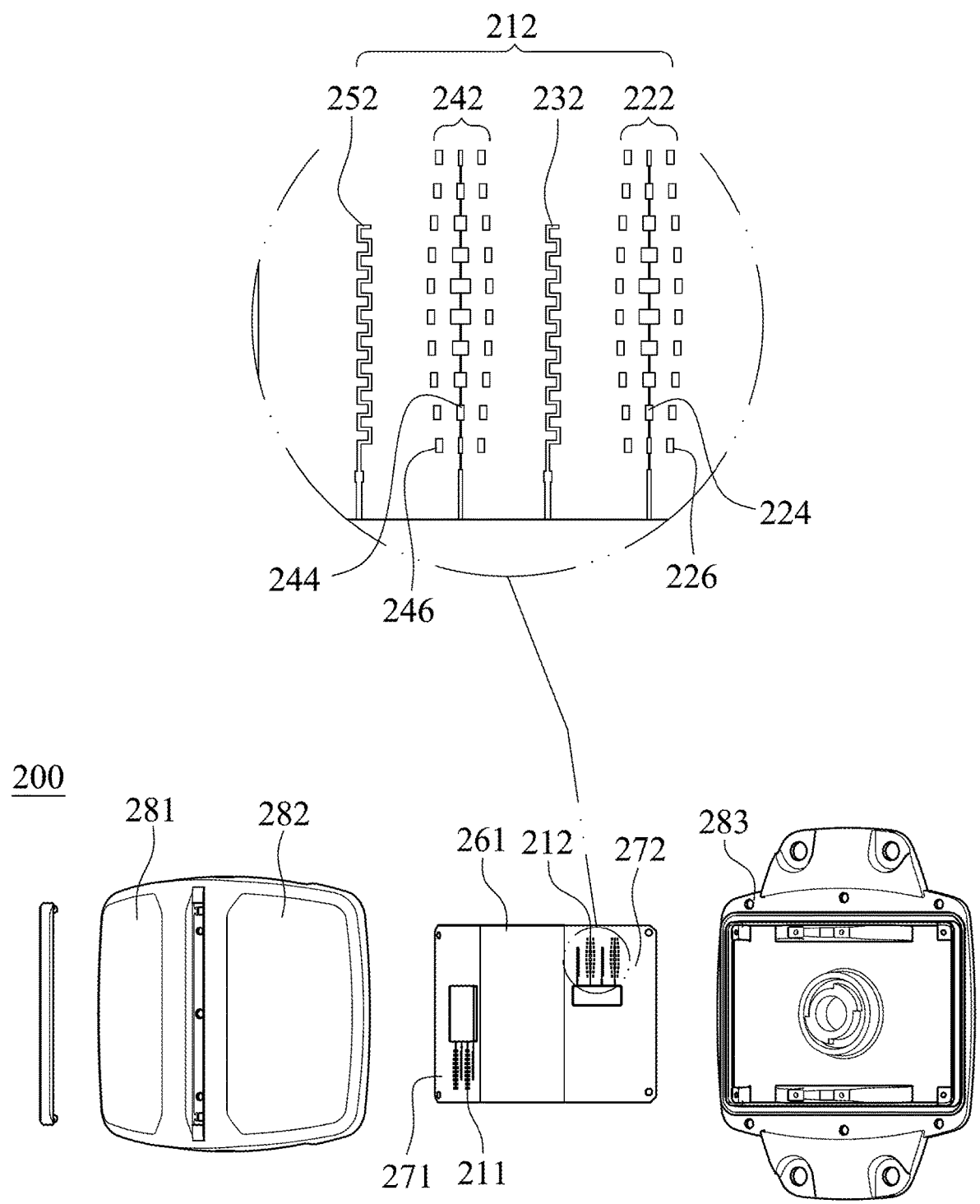
FIG. 2E is further another exploded view of the vehicle radar device according to the 2nd embodiment.

FIG. 2A is a schematic view of a vehicle radar device 200 according to the 2nd embodiment of the present disclosure, FIG. 2B is a cross-sectional view along line 2B-2B of FIG. 2A, FIG. 2C is an exploded view of the vehicle radar device 200 according to the 2nd embodiment of the present disclosure, FIG. 2D is an exploded view of the vehicle radar device 200 which faces a first board portion 271 according to the 2nd embodiment, and FIG. 2E is an exploded view of the vehicle radar device 200 which faces a second board portion 272 according to the 2nd embodiment. It should be mentioned that in the drawings of the 2nd embodiment, the assembled or fixed elements and detailed elements on a circuit board 261 are omitted. In FIG. 2A to FIG. 2E, the vehicle radar device 200 includes a first antenna unit 211, a second antenna unit 212, a computing unit 207 and a circuit board 261.

The first antenna unit 211 and the second antenna unit 212 are communicatively connected to the computing unit 207. The circuit board 261 includes a first board portion 271 and a second board portion 272. The first antenna unit 211 is a circuit board type and disposed on the first board portion 271, the second antenna unit 212 is a circuit board type and disposed on the second board portion 272. The first board portion 271 is a part of the circuit board 261, the second board portion 272 is another part of the circuit board 261, the computing unit 207 disposed on the first board portion 271. In the 2nd embodiment, P12 is 120 degrees.

The vehicle radar device 200 further includes a housing 280, wherein the first antenna unit 211, the second antenna unit 212, the computing unit 207 and the circuit board 261 are all disposed in the housing 280, and the housing 280 includes a bottom 283. In the 2nd embodiment, B1 is 30 degrees, B2 is 30 degrees. A thickness from an outer surface 284 of the bottom 283 is HT, and HT is about 28.9 mm.

The housing 280 further includes two covering members, that is, covering members 281, 282. A thickness of entire covering member 281 is substantially identical; a thickness of entire covering member 282 is substantially identical. The first board portion 271 is parallel to the covering member 281 and the distance therebetween is S1. The second board portion 272 is parallel to the covering member 282 and the distance therebetween is S2. In the 2nd embodiment, S1 is 2.5 mm, S2 is 2.5 mm.

In FIG. 2D and FIG. 2E, a number of the computing unit 207 is one. The first antenna unit 211 and the second antenna unit 212 are communicatively connected to the computing unit 207. The computing unit 207 is disposed on the first board portion 271.

In the 2nd embodiment, a number of the circuit board 261 is one, the first board portion 271 and the second board portion 272 are both disposed on the circuit board 261. Thus, it is favorable for reducing the complexity of the mechanism design of the vehicle radar device 200. In detail, the circuit board 261 is non-planar, which can be made by method such as molding and extruding, but is not limited thereto.

An operating frequency of the first antenna unit 211 and an operating frequency of the second antenna unit 212 are both greater than 10 GHz. In the 2nd embodiment, the operating frequency of the first antenna unit 211 and the operating frequency of the second antenna unit 212 are both about 79 GHz. The first antenna unit 211 includes the first transmitting antennas 221, 231 and the first receiving antennas 241, 251. The second antenna unit 212 includes the second transmitting antennas 222, 232 and the second receiving antennas 242, 252.

In the 2nd embodiment, each of the first transmitting antenna 221, the first receiving antenna 241, the second transmitting antenna 222 and the second receiving antenna 242 includes a patch antenna.

Each of the first transmitting antenna 231, the first receiving antenna 251, the second transmitting antenna 232 and the second receiving antenna 252 is meander line antenna. Hence, the first antenna unit 211 and the second antenna unit 212 can be more flexible while obtaining the plane with sufficient beam width and designing polarization, and it is further favorable for achieving a compact size of the vehicle radar device 200. In other embodiments according to the present disclosure, a partial structure or an entire structure of the at least one of the first transmitting antenna, the first receiving antenna, the second transmitting antenna and the second receiving antenna can be an antenna type of a meander line antenna. And the type of the meander line antenna can be single meander line antenna (such as the first transmitting antenna 231), two-strip meander line antenna, tapered meander line antenna and folded meander line antenna, but is not limited thereto.

The first antenna unit 211 includes at least two first receiving antennas (that is, the first receiving antennas 241, 251), which are in two antenna types, respectively. The second antenna unit 212 includes at least two second receiving antennas (that is, the second receiving antennas 242, 252), which are in two antenna types, respectively. Thus, it is favorable for designing a sufficient beam width for at least two different kinds of surface of the first antenna unit 211 and the second antenna unit 212. In the 2nd embodiment, the first antenna unit 211 includes two first receiving antennas (that is, the first receiving antennas 241, 251). Each of the first receiving antennas 241, 251 is a type having a SFPA 243 and meander line antenna. The second antenna unit 212 includes two second receiving antennas (that is, the second receiving antennas 242, 252). Each of the second receiving antennas 242, 252 is a type having a SFPA 244 and meander line antenna.

In detail, a number of each of the first transmitting antenna 221, the first transmitting antenna 231, the first receiving antenna 241 and the first receiving antenna 251 is one. On the first board portion 271, the first transmitting antenna 221 includes a SFPA 223 and a plurality of metal pads 225 arranged on the two sides of the SFPA 223 along the direction of the aforementioned array, the first transmitting antenna 231 is meander line antenna. The first receiving antenna 241 includes a SFPA 243 and a plurality of metal pads 245 arranged on the two sides of the SFPA 243 along the direction of the aforementioned array, the first receiving antenna 251 is meander line antenna. The arrangements of the first transmitting antennas 221, 231 and the first receiving antennas 241, 251 are as shown in FIG. 2D, but is not limited thereto. A number of each of the second transmitting antenna 222, the second transmitting antenna 232, the second receiving antenna 242 and the second receiving antenna 252 is one. On the second board portion 272, the second transmitting antenna 222 includes a SFPA 224 and a plurality of metal pads 226 arranged on the two sides of the SFPA 224 along the direction of the aforementioned array, the second transmitting antenna 232 is meander line antenna. The second receiving antenna 242 includes a SFPA 244 and a plurality of metal pads 246 arranged on the two sides of the SFPA 244 along the direction of the aforementioned array, the second receiving antenna 252 is meander line antenna. The arrangements of second transmitting antennas 222, 223 and second receiving antennas 242, 252 are as shown in FIG. 2E, but is not limited thereto. In other embodiments according to the present disclosure (not shown in drawings), a number of each of the first transmitting antenna, the first receiving antenna, the second transmitting antenna and the second receiving antenna can be different, each of the antennas can be more than three antenna types, and each of the number thereof can be more than two.

Figure 2F:
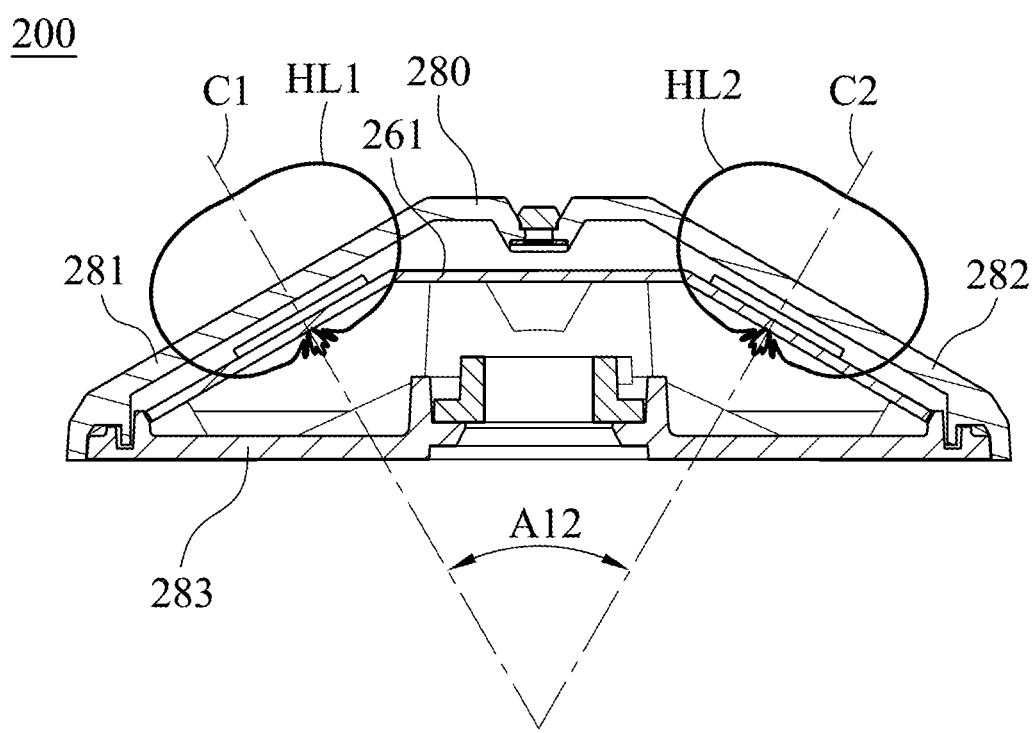
FIG. 2F is a schematic view of parameters of the vehicle radar device according to the 2nd embodiment.

FIG. 2F is a schematic view of a parameter A12 of the vehicle radar device 200 according to the 2nd embodiment, and the main lobes HL1, HL2 are not physical structures of the vehicle radar device 200 in FIG. 2F. Under the operating frequency of the first antenna unit 211 and the operating frequency of the second antenna unit 212, an angle between the centerline C1 of the main lobe HL1 of the first antenna unit 211 on a plane and the centerline C2 of the main lobe HL2 of the second antenna unit 212 on the plane is A12, and the aforementioned plane is vertical to the first board portion 271, the second board portion 272 and the outer surface 284, as shown in FIG. 2F. In the 2nd embodiment, A12 is 60 degrees.

Specifically, a direction of the centerline C1 of the main lobe HL1 of the first antenna unit 211 on the aforementioned plane is the direction of a maximum gain of a three-dimensional radiation pattern of the first antenna unit 211. A direction of the centerline C2 of the main lobe HL2 of the second antenna unit 212 on the aforementioned plane is the direction of a maximum gain of a three-dimensional radiation pattern of the second antenna unit 212. Furthermore, according to the present disclosure, a parameter A12 can be an angle between the centerline of the main lobe of the at least one of the first transmitting antennas 221, 231 on the aforementioned plane and the center line of the main lobe of the at least one of the second transmitting antennas 222, 232 on the aforementioned plane or the parameter A12 can be an angle between the centerline of the main lobe of the at least one of the first receiving antennas 241, 251 on the aforementioned plane and the centerline of the main lobe of the at least one of the second receiving antennas 242, 252 on the aforementioned plane. Moreover, the parameter A12 in FIG. 2F is represented by the main lobe HL1 of the first receiving antenna 241 and the main lobe HL2 of the second receiving antenna 242.

Furthermore, a HPBW of the main lobe HL1 of the first antenna unit 211 on the plane is AH1, which can be similar to the parameter AH1 in FIG. 1G according to the aforementioned 1st embodiment. A HPBW of the main lobe HL2 of the second antenna unit 212 on the plane is AH2, and the aforementioned plane is vertical to the first board portion 271, the second board portion 272 and the outer surface 284. In the 2nd embodiment, AH1 is 120 degrees; AH2 is 120 degrees.

Figure 2G:
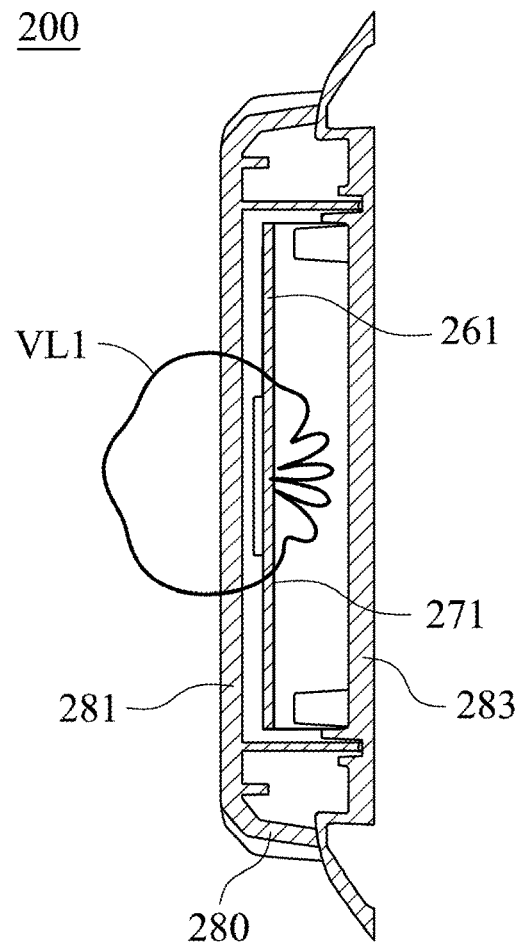
FIG. 2G is a cross-sectional view along line 2G-2G of FIG. 2B.
Figure 2H:
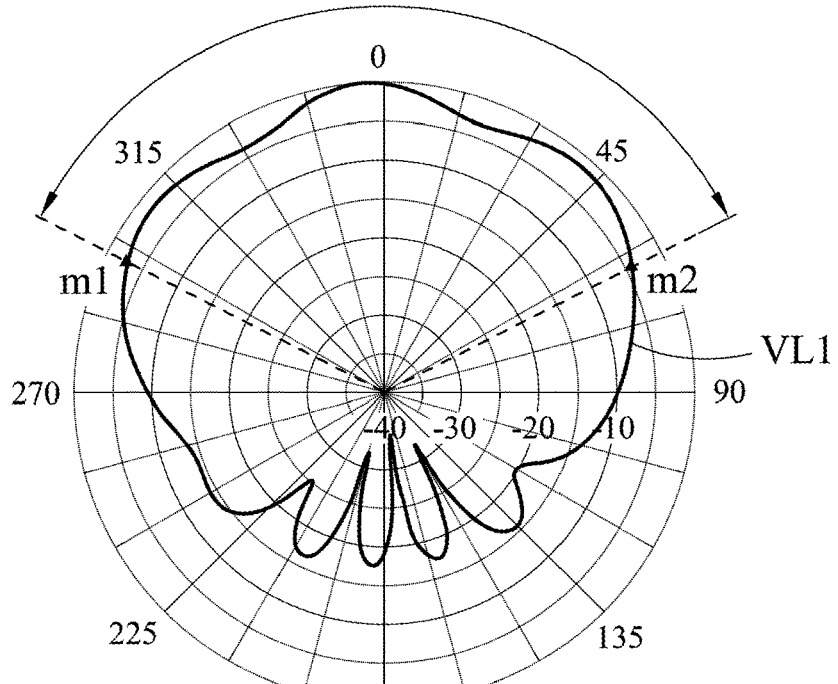
FIG. 2H is another schematic view of parameters of the vehicle radar device according to the 2nd embodiment.

FIG. 2G is a cross-sectional view along line 2G-2G of FIG. 2B, wherein a main lobe VL1 is not physical structure of the vehicle radar device 200 in FIG. 2G. FIG. 2H is a schematic view of a parameter AV1 of the vehicle radar device 200, and FIG. 2H is also a schematic view of a radiation pattern of the first antenna unit 211 on the another plane (that is, the plane in FIG. 2G), especially a schematic view of a radiation pattern when the polarization direction of the measuring antenna is parallel to the aforementioned another plane (as shown in FIG. 2G). In detail, FIG. 2H can be a schematic view of a radiation pattern of the first transmitting antenna 231 (i.e. meander line antenna) on the aforementioned another plane. FIG. 2H can also be a schematic view of a radiation pattern of the first receiving antenna 251 on the aforementioned another plane. In the 2nd embodiment, the schematic view of a parameter AV2 of a radiation pattern of the second transmitting antenna 232 or the second receiving antenna 252 on the aforementioned further another plane is similar to FIG. 2H.

In FIG. 2G and FIG. 2H, a HPBW of a main lobe VL1 of the first antenna unit 211 on the another plane is AV1, which is defined by half power markers m1 and m2 in FIG. 2H, the another plane is vertical to the plane (that is, the plane in FIG. 2F) and the first board portion 271. A HPBW of the main lobe of the second antenna unit 212 on the further another plane is AV2 (not shown in drawings). The further another plane is vertical to the plane and the second board portion 272, the following conditions are satisfied: 100 degrees≤AV1≤180 degrees; and 100 degrees≤AV2≤180 degrees. Thus, the vehicle radar device 200 can obtain a sufficient detecting range for applying on both a horizontal plane and a vertical plane. In the 2nd embodiment, AV1 is 128 degrees; AV2 is 128 degrees.

Moreover, in the first antenna unit 211, each of the first transmitting antennas 221, 231 has HPBW AH1, AV1 on two planes, and an angle between the two planes is 90 degrees. Each of the first receiving antennas 241, 251 has HPBW AH1, AV1 on two planes, and an angle between the two planes is 90 degrees. Each of the aforementioned two planes is the plane in FIG. 2F and FIG. 2G. Each of the two planes can be horizontal plane and vertical plane in actual practice. FIG. 2F can be a schematic view of a radiation pattern measurement of horizontal polarization (that is, AH1 is 120 degrees) of the first transmitting antenna 221 or the first receiving antenna 241. FIG. 2G can be a schematic view of a radiation pattern measurement of vertical polarization (that is, AV1 is 128 degrees). Thus, the aforementioned first transmitting antennas 221, 231 and the aforementioned first receiving antennas 241, 251 can be used alternately or simultaneously, so the aforementioned two planes which are different by 90 degrees can have a sufficient detecting range. In the second antenna unit 212, each of the second transmitting antennas 222, 232 has HPBW AH2, AV2 on the aforementioned two planes. An angle between the aforementioned two planes is 90 degrees. Each of the second receiving antennas 242, 252 has HPBW AH2, AV2 on the aforementioned two planes. An angle between the aforementioned two planes is 90 degrees. Thus, the aforementioned second transmitting antennas 222, 232 and the aforementioned second receiving antennas 242, 252 can be used alternately or simultaneously, so the aforementioned two planes which are different by 90 degrees can have a sufficient detecting range. In the related art, the beam width of vehicle radar device is mainly on a single plane (such as horizontal plane), when the vehicle radar device 200 is used as a radius difference between inner wheels detecting radar, the detecting targets are those pedestrians, bikes and motorcycles which have a weak reflected signal. Thus, the first antenna unit 211 and the second antenna unit 212 have sufficient beam width on the horizontal plane and the vertical plane. Therefore, it is favorable for increasing the effect of the acquisition of signal of the vehicle radar device 200.

Figure 3:
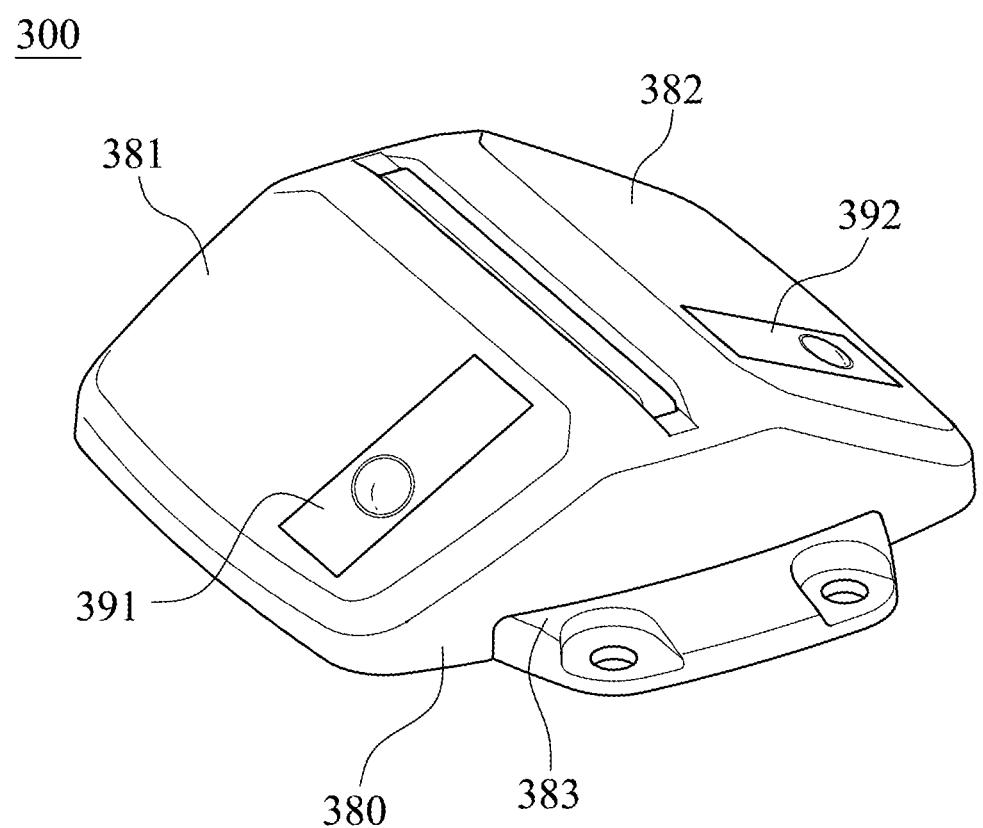
FIG. 3 is a schematic view of a vehicle radar device according to the 3rd embodiment.

FIG. 3 is a schematic view of the vehicle radar device 300 according to the 3rd embodiment of the present disclosure. In the 3rd embodiment, the vehicle radar device 300 includes a first antenna unit, a second antenna unit, a computing unit and a circuit board. The first antenna unit and the second antenna unit are communicatively connected to the computing unit. The circuit board includes a first board portion and a second board portion. The first antenna unit is a circuit board type and disposed on the first board portion. The second antenna unit is a circuit board type and disposed on the second board portion. The computing unit is disposed on the one of the first board portion and the second board portion.

In FIG. 3, the vehicle radar device 300 further includes a housing 380, wherein the first antenna unit, the second antenna unit, the computing unit and the circuit board are all disposed in the housing 380. The housing 380 includes a bottom 383 and covering members 381, 382.

The vehicle radar device 300 further includes floor lamps 391, 392, wherein the floor lamps 391, 392 illuminate outwardly from the covering members 381, 382 of the housing 380. Thus, when the vehicle radar device 300 is used as a detecting radar for inner wheels radius difference which equipped with the floor lamps 391, 392, the vehicle radar device 300 can project a dangerous area so as to alert the pedestrians and the adjacent vehicles to avoid when the vehicle is determined as at a turning action. Moreover, each of the floor lamps 391, 392 illuminates the LED light source on the film, and projects the image on an object by refracting the image on the film via the lens. Furthermore, except the floor lamps 391, 392 arranged in the vehicle radar device 300 according to the 3rd embodiment, other characteristics of the vehicle radar device 300 may be the same as the corresponding characteristics of the vehicle radar device 200 according to the 2nd embodiment.

Figure 4A:
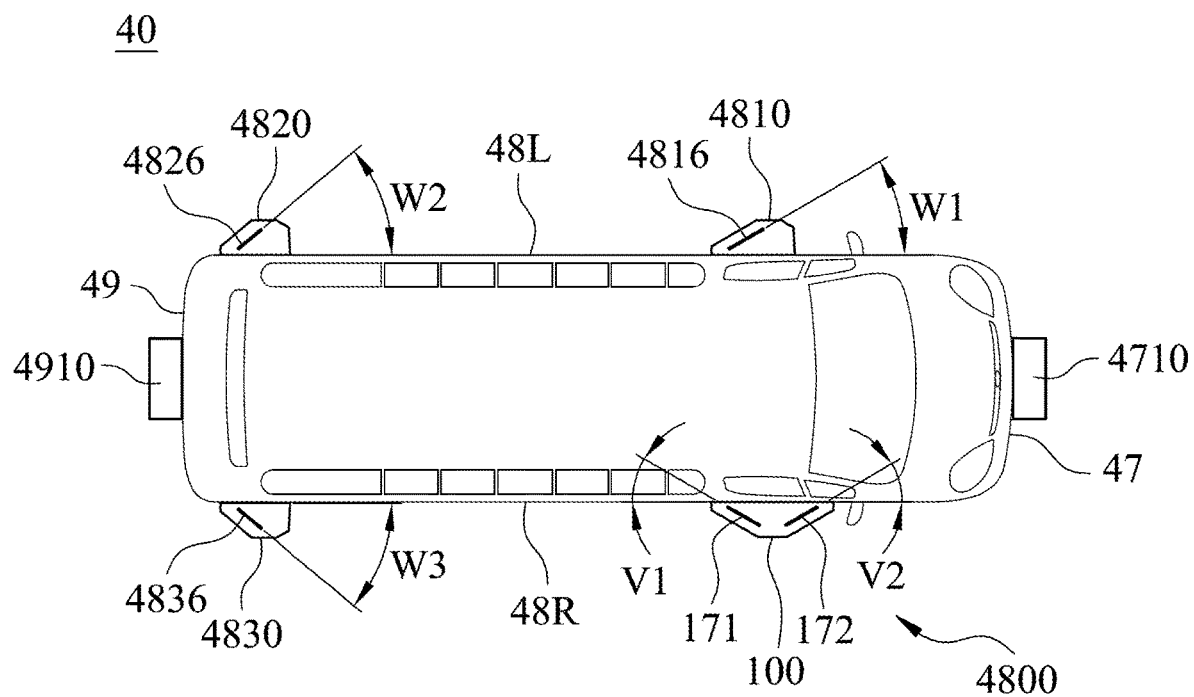
FIG. 4A is a schematic view of a vehicle radar system which is disposed in a vehicle according to the 4th embodiment of the present disclosure.
Figure 4B:
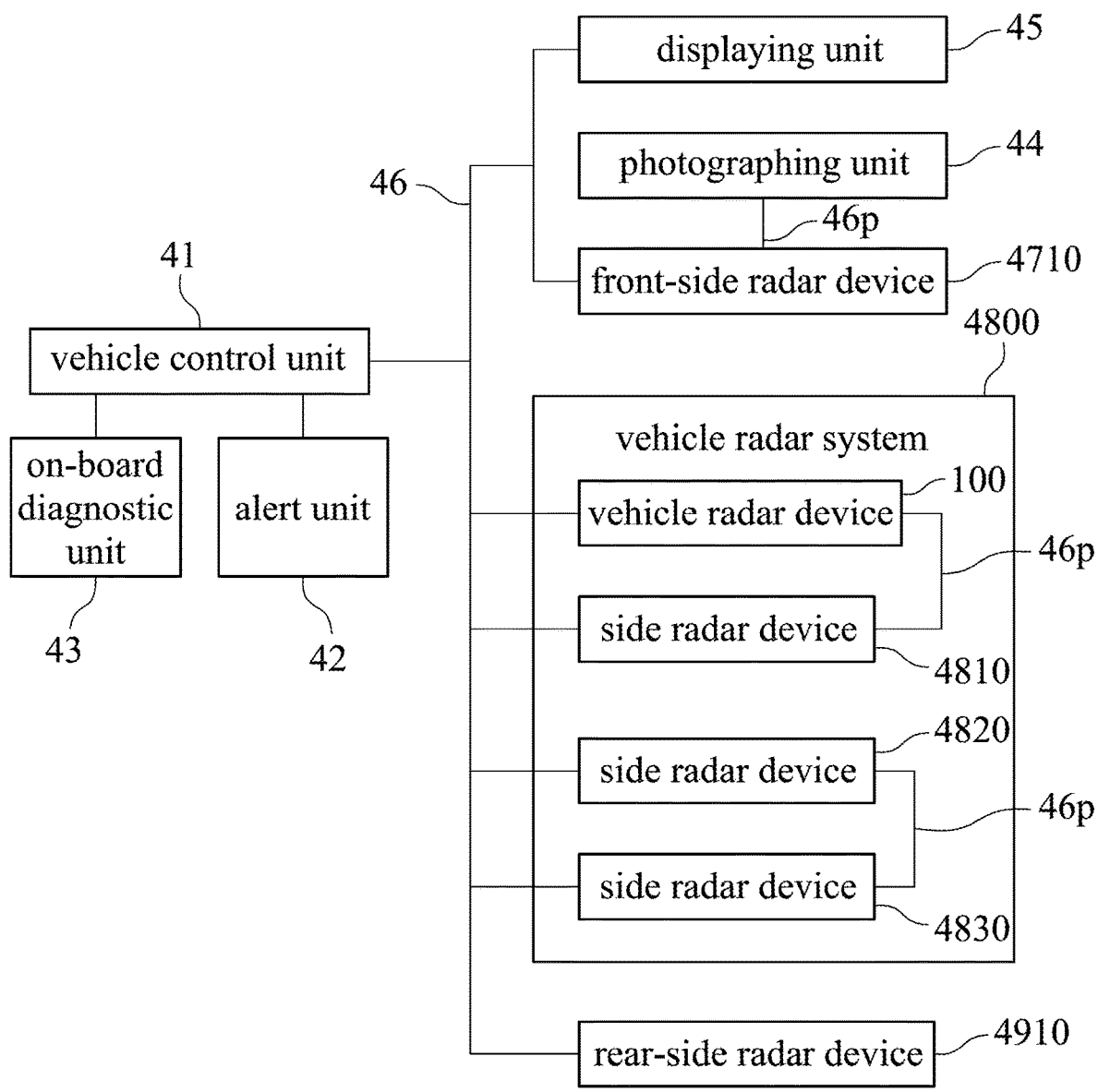
FIG. 4B is a block diagram of the vehicle radar system which is disposed in the vehicle according to the 4th embodiment.

FIG. 4A is a schematic view of a vehicle radar system 4800, which is disposed in a vehicle 40 (not shown in actual proportion) according to the 4th embodiment of the present disclosure. FIG. 4B is a block diagram of the vehicle radar system 4800, which is disposed in the vehicle 40 according to the 4th embodiment. In FIG. 4A and FIG. 4B, the vehicle radar system 4800 is disposed in the vehicle 40, the vehicle radar system 4800 includes the vehicle radar device 100 according to the aforementioned 1st embodiment, a number of the vehicle radar device 100 is one. The vehicle radar device 100 is disposed on the at least one side of a left side 48L and a right side 48R (specifically disposed on the right side 48R). Furthermore, a vehicle body of the vehicle 40 includes a front side 47, a left side 48L, a right side 48R and a rear side 49, and the front side 47, the left side 48L, the right side 48R and the rear side 49 substantially form a square, such as FIG. 4A. In other embodiments according to the present disclosure, a vehicle radar device can be disposed on the left side of the vehicle, and the vehicle radar system can include the vehicle radar device 200 according to the aforementioned 2nd embodiment, the vehicle radar device 300 according to the aforementioned 3rd embodiment, or vehicle radar devices according to other embodiments of the present disclosure.

In FIG. 1B and FIG. 4A, the vehicle radar device 100 includes the first antenna unit 111, the second antenna unit 112, the computing unit 107 and the circuit boards 161, 162. The first antenna unit 111 and the second antenna unit 112 are communicatively connected to the computing unit 107. Each of the circuit boards 161, 162 includes the first board portion 171 and the second board portion 172. The first board portion 171 and the second board portion 172 are both vertical to the horizontal plane of the vehicle 40 (that is, the plane in FIG. 4A). The first antenna unit 111 is a circuit board type and disposed on the first board portion 171. The second antenna unit 112 is a circuit board type and disposed on the second board portion 172. The computing unit 107 is disposed on the first board portion 171. When an angle between the first board portion 171 and the second board portion 172 is P12, the following condition is satisfied: 80 degrees≤P12≤130 degrees. Thus, it is favorable for simplifying the number of the devices in the vehicle radar system 4800 and reducing the detecting blind spot thereof so as to increase the detecting range and accuracy. In the 4th embodiment, P12 is 120 degrees. The details related to the vehicle radar device 100 are described in the aforementioned 1st embodiment, and will not be described herein again.

In FIG. 4A, when an angle between the first board portion 171 and the right side 48R of the vehicle 40 which the vehicle radar device 100 disposed thereon is V1, and an angle between the second board portion 172 and the right side 48R of the vehicle 40 which the vehicle radar device 100 disposed thereon is V2, the following conditions are satisfied: 25 degrees≤V1≤50 degrees; and 25 degrees≤V2≤50 degrees. Thus, when the vehicle 40 is a large vehicle in an environment of left-hand traffic, especially a public transport such as bus, based on laws in some countries (such as EU), if there is any vehicle approached a side of passengers (that is, a side of a bus door, the right side 48R in the 4th embodiment) in a range of 15 m (it can be on the right of the right side 48R, in a range of 3 m wide and 6 m longer than the vehicle body of the vehicle 40), the vehicle 40 should produce a alert signal in advance according to the estimate by the vehicle control unit 41. The condition of the aforementioned parameters V1 and V2 of the vehicle radar system 4800 is satisfied which is favorable for achieving a field of view (FOV) more than 180 degrees and a detecting distance more than 30 m of the first antenna unit 111, the second antenna unit 112 and the related elements of the vehicle radar device 100, so as to compliance with the aforementioned laws and achieve the features of the radius difference between inner wheels detection, the blind spot detection (BSD) and the lane change assistance (LCA). In the 4th embodiment, V1 is 30 degrees; V2 is 30 degrees. Moreover, because the outer surface 184 of the bottom 183 of the housing 180 is parallel to the right side 48R of the vehicle 40 which the vehicle radar device 100 is disposed thereon, V1 is the same as B1; V2 is the same as B2.

In FIG. 1B, the vehicle radar device 100 further includes the housing 180, wherein the first antenna unit 111, the second antenna unit 112, the computing unit 107 and the circuit boards 161, 162 are all disposed in the housing 180. The housing 180 includes the bottom 183, the outer surface 184 of the bottom 183 is parallel to the right side 48R of the vehicle 40 which the vehicle radar device 100 is disposed thereon. When a thickness from an outer surface 184 of the bottom 183 of the vehicle radar device 100 is HT, the following condition is satisfied: 15 mm HT 50 mm. Thus, it is favorable for assembling on the outer surface of the vehicle 40 but not to be too protruding so as to be in compliance, and obtaining a sufficient detecting angle and range of the vehicle radar system 4800. In the 4th embodiment, HT is about 29.9 mm.

In FIG. 4A and FIG. 4B, the length of the vehicle 40 can be ranged from 10 m to 18 m. A number of the vehicle radar device 100 is one, and the vehicle radar device 100 is disposed on the right side 48R of the vehicle 40. Thus, if the vehicle 40 is a large vehicle in an environment of left-hand traffic, especially a public transport such as bus based on laws, and achieves the features of the radius difference between inner wheels detection, BSD and LCA. In the 4th embodiment, the vehicle 40 is a bus, and the length is 15 m.

The vehicle radar system 4800 can further include a side radar device 4810, the side radar device 4810 is disposed on the left side 48L of the vehicle. The one of the side radar device 4810 and the vehicle radar device 100 are communicatively connected to a vehicle control unit 41 of the vehicle 40 via the other one of the side radar device 4810 and the vehicle radar device 100. Thus, it is favorable for increasing the communicative efficiency of the vehicle radar system 4800 and the vehicle control unit 41 of the vehicle 40.

In detail, the vehicle radar system 4800 includes three side radar devices. The operating frequency of the side radar devices 4810, 4820 and 4830 are all about 79 GHz, wherein the side radar devices 4810, 4820 are disposed on the left side 48L of the vehicle 40, the side radar device 4830 is disposed on the right side 48R of the vehicle 40. According to the present disclosure, the vehicle radar system 4800 can achieve the features of the radius difference between inner wheels detection, the rear cross traffic alert (RCTA), the BSD and the LCA by the vehicle radar device 100, the side radar devices 4810, 4820 and 4830 included in the vehicle radar system 4800. Furthermore, the second antenna unit 112 and the related elements of the vehicle radar device 100 can provide a detecting data of a right-front side of the vehicle 40 and used for the feature of the radius difference between inner wheels detecting. Each of the side radar devices 4820, 4830 can provide the detecting data of a left-rear side and a right-rear side of the vehicle 40, which is for the feature of the RCTA of the vehicle 40. The vehicle radar device 100, the side radar devices 4810, 4820 and 4830 can provide the detecting data of the left side, the right side, the left-rear side, the right-rear side of the vehicle 40, and used for the feature of the BSD and the LCA of vehicle 40. Moreover, the application of the vehicle radar system 4800 and the vehicle radar device 100, the side radar devices 4810, 4820 and 4830 of the vehicle radar system 4800 are not limited in the aforementioned features.

Figure 4C:
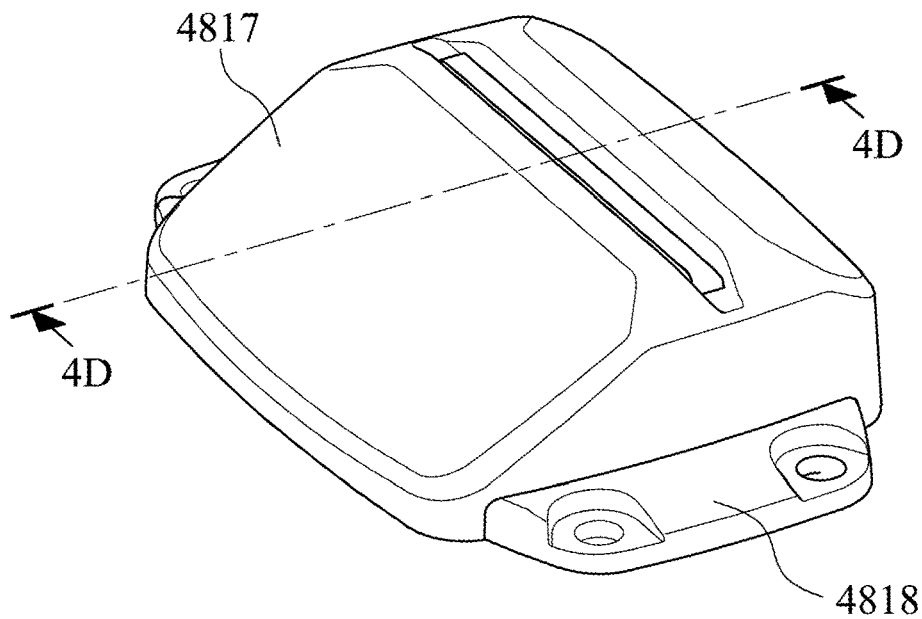
FIG. 4C is a schematic view of a side radar device according to the 4th embodiment.
Figure 4D:
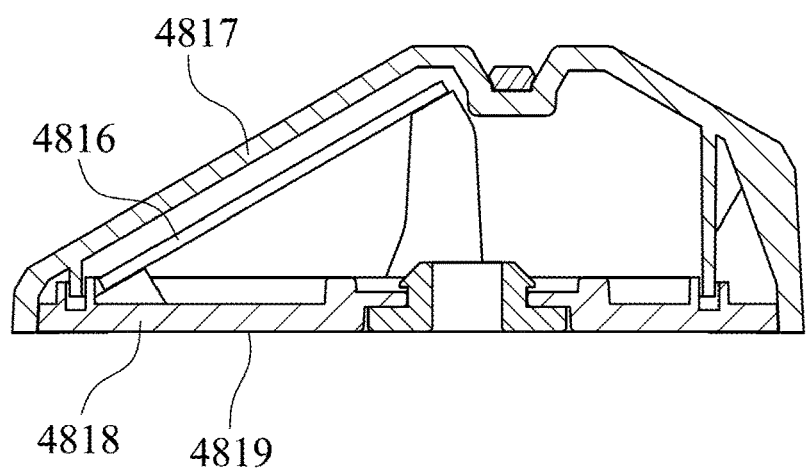
FIG. 4D is a cross-sectional view along line 4D-4D of FIG. 4C.
Figure 4E:
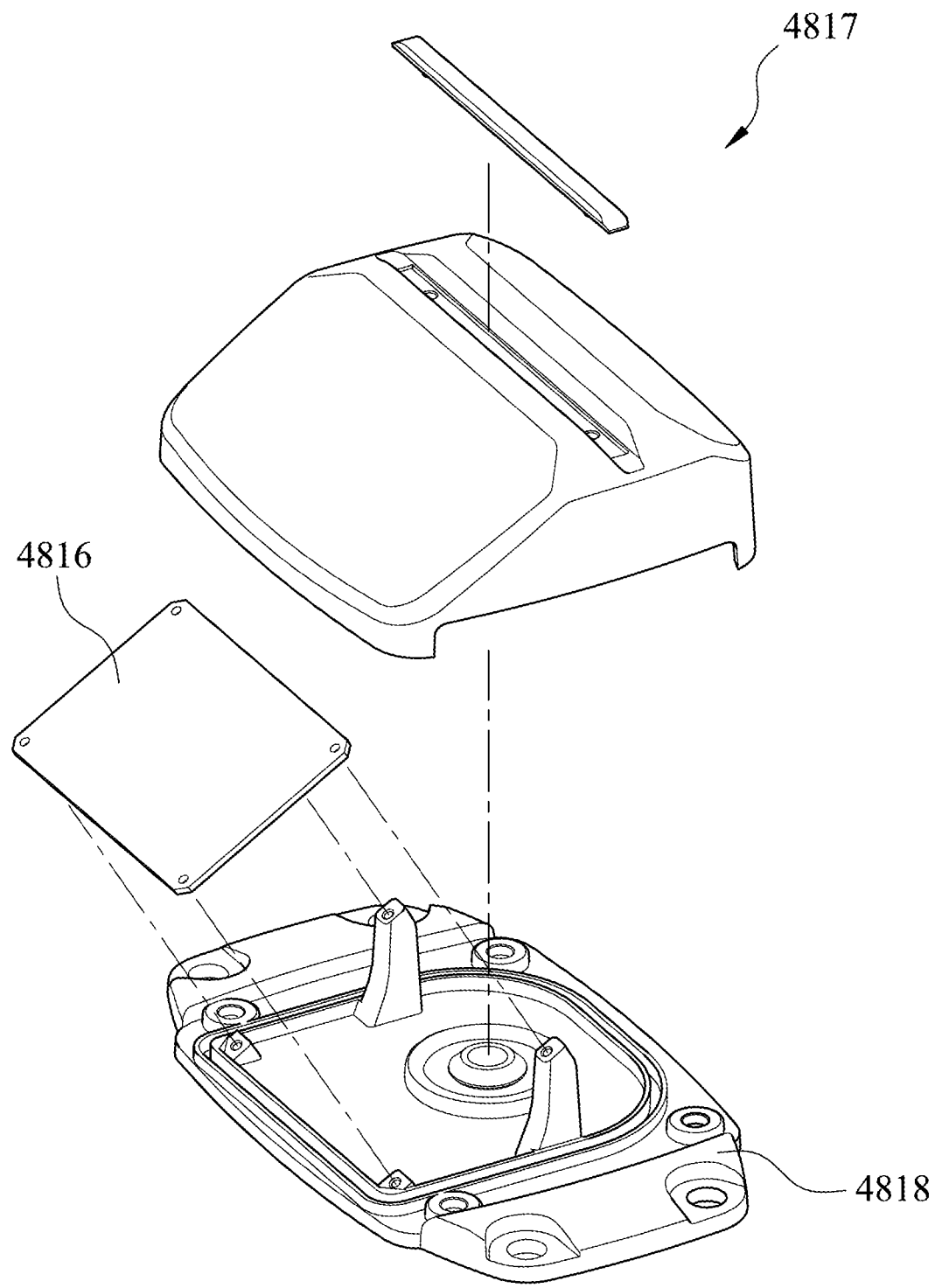
FIG. 4E is an exploded view of the side radar device of FIG. 4C.

In FIG. 4C to FIG. 4E, FIG. 4C is a schematic view of the side radar device 4810 according to the 4th embodiment. FIG. 4D is a cross-sectional view along line 4D-4D of FIG. 4C. FIG. 4E is an exploded view of the side radar device 4810. In FIG. 4A and FIG. 4C to FIG. 4E, the side radar device 4810 includes a circuit board 4816, and an antenna unit and a computing unit (which is not shown in drawing and the antenna unit can be a circuit board type or not a circuit board type) are disposed on the circuit board 4816, and the antenna unit, the computing unit and the circuit board 4816 are disposed in the housing 4817. The side radar device 4810 is disposed on the left side 48L of the vehicle 40, and is corresponding to the right side 48R of the vehicle radar device 100 (especially the first antenna unit 111 and the related elements). An angle W1 between the circuit board 4816 of the side radar device 4810 and the left side 48L of the vehicle 40 which the side radar device 4810 disposed thereon is 30 degrees. Moreover, the housing 4817 includes a bottom 4818, an outer surface 4819 of the bottom 4818 is parallel to the left side 48L of the vehicle 40 which the side radar device 4810 is disposed thereon. Therefore, an angle between the circuit board 4816 and the outer surface 4819 of the bottom 4818 is also 30 degrees (the parameter in FIG. 4D is omitted).

Figure 4F:
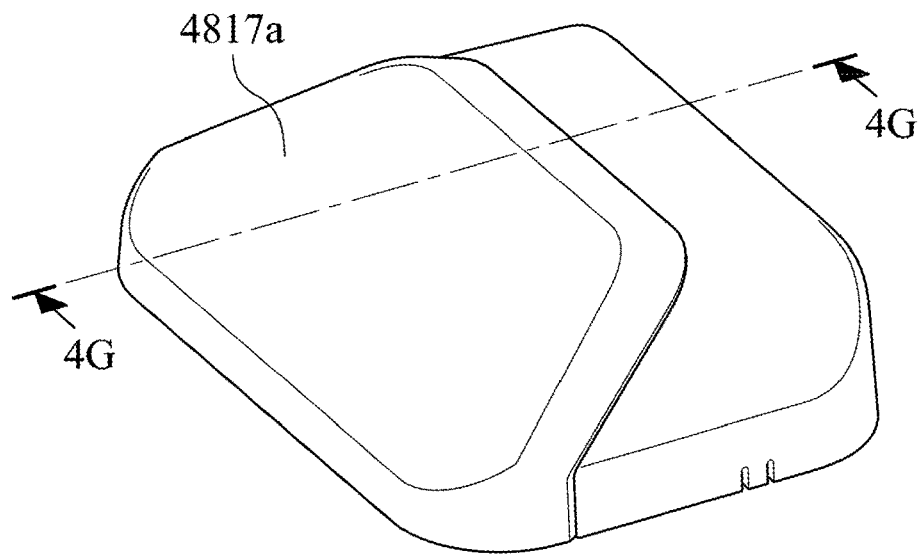
FIG. 4F is a schematic view of another side radar device according to the 4th embodiment.
Figure 4G:
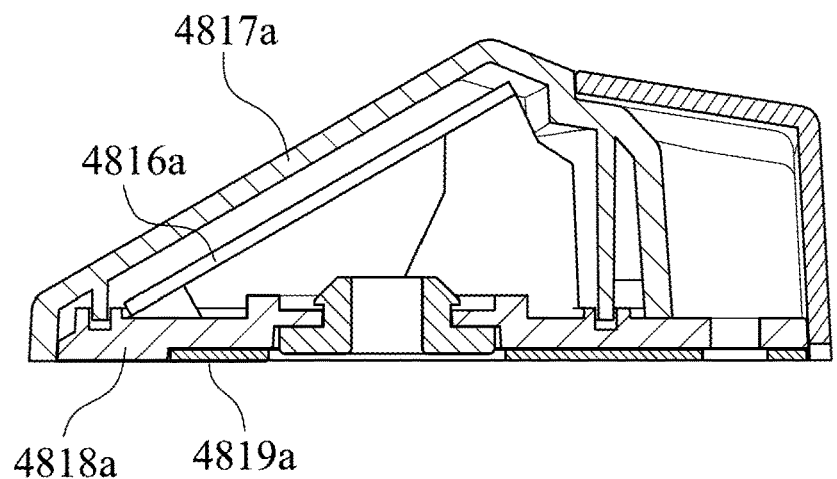
FIG. 4G is a cross-sectional view along line 4G-4G of FIG. 4F.
Figure 4H:
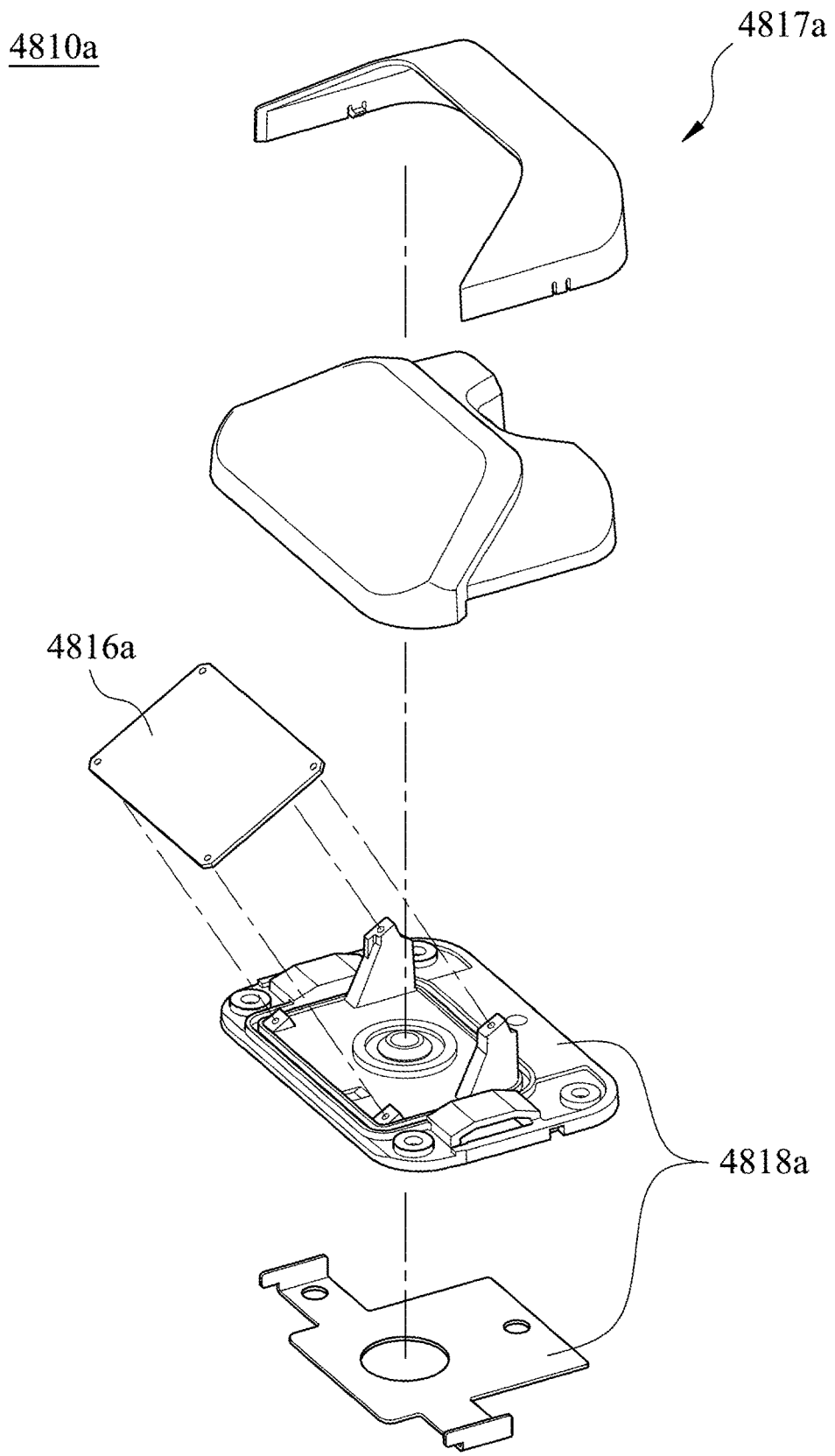
FIG. 4H is an exploded view of the side radar device.

FIG. 4F is a schematic view of a side radar device 4810a according to the 4th embodiment. FIG. 4G is a cross-sectional view along line 4G-4G of FIG. 4F. FIG. 4H is an exploded view of the side radar device 4810a. According to the 4th embodiment of the present disclosure, the side radar device 4810 of the vehicle radar system 4800 can be alternated by the side radar device 4810a. In FIG. 4A, FIG. 4F to FIG. 4H, the side radar device 4810a includes a circuit board 4816a, and an antenna unit, a computing unit (not shown in drawing and the antenna unit can be a circuit board type or not a circuit board type) are disposed in the circuit board 4816a. The antenna unit, the computing unit and the circuit board 4816a are disposed in the housing 4817a. The side radar device 4810*a* is disposed on the left side 48L of the vehicle 40, and corresponding to the right side 48R of the vehicle radar device 100 (especially the first antenna unit 111 and the related elements). An angle W1 between the circuit board 4816*a* of the side radar device 4810*a* and the left side 48L of the vehicle 40 which the side radar device 4810*a* disposed thereon is 30 degrees. Moreover, the housing 4817*a* includes a bottom 4818*a*, wherein an outer surface 4819*a* of the bottom 4818*a* is parallel to the left side 48L of the vehicle 40 which the side radar device 4810*a* is disposed thereon. Therefore, an angle between the circuit board 4816*a* and the outer surface 4819*a* of the bottom 4818*a* is also 30 degrees.

In FIG. 4A, an angle V2 between the second board portion 172 of the vehicle radar device 100 and the right side 48R is 30 degrees. Thus, the vehicle radar device 100 provides the detecting data of the right side of the front part for the vehicle 40, and is used for the features of the radius difference between inner wheels detection, the BSD and the LCA. An angle V1 between the first board portion 171 of the vehicle radar device 100 and the right side 48R is 30 degrees. Thus, the vehicle radar device 100 provides the detecting data of the right side of the rear part for the vehicle 40, and is used for the features of the BSD and the LCA. An angle W1 between the circuit board 4816 of the side radar device 4810 and the left side 48L is 30 degrees. Thus, the vehicle radar device 100 provides the detecting data of the left side of the rear part for the vehicle 40, and is used for the features of the BSD and the LCA. An angle W2 between a circuit board 4826 of the side radar device 4820 and the left side 48L is 40 degrees. Thus, the vehicle radar device 100 provides the detecting data of the left-rear side for the vehicle, and is used for the features of the RCTA, the BSD and the LCA. An angle W3 between a circuit board 4836 of the side radar device 4830 and the right side 48R is 40 degrees. Thus, the vehicle radar device 100 provides the detecting data of the right-rear side for the vehicle, and is used for the features of the RCTA, the BSD and the LCA. Moreover, the antenna unit of the side radar devices 4810, 4820 and 4830 can be a circuit board type or not a circuit board type. The arrangements of the side radar devices 4820, 4830 can be similar to the side radar devices 4810 or 4810*a*, but the value of the parameters W2 and W3 are both 40 degrees.

In FIG. 4A and FIG. 4B, with respect to the feature of detecting the object out of the vehicle 40, the vehicle 40 includes the vehicle radar system 4800, a front-side radar device 4710 and a rear-side radar device 4910. The operating frequency of the front-side radar device 4710 is about 77 GHz and is disposed on the front side 47 of the vehicle 40. The front-side radar device 4710 can provide a detecting data of the front side of the vehicle 40, and is used for the features of the front collision warning (FCW) and the lane departure warning (LDW). The operating frequency of the rear-side radar device 4910 is about 77 GHz, and is disposed on the rear side 49 of the vehicle 40. The rear-side radar device 4910 can provide a detecting data of the rear side of the vehicle 40, and is used for the features of the rear collision warning (RCW). The vehicle 40 further includes the vehicle control unit 41, a alert unit 42, an on-board diagnostic unit 43, a photographing unit 44 and a displaying unit 45, and the vehicle control unit 41 is communicatively connected to other units via the controller area network (CAN) 46.

In the vehicle radar system 4800 of the 4th embodiment, the vehicle radar device 100 is communicatively connected to the side radar device 4810 via a private CAN 46*p*, the side radar devices 4820, 4830 are communicatively connected via the private CAN 46*p*. Thus, the private CAN 46*p* can be used to form a subnetwork between particular radar devices and transmit data, and the regular one of the vehicle radar device 100, the side radar devices 4810, 4820 and 4830 or one of the above decided by algorithm will be a master radar device of the vehicle radar system 4800 so as to transfer the detecting data of the vehicle radar device 100, the side radar devices 4810, 4820 and 4830 to other units of the vehicle 40. It is favorable for reducing the over occupation of the CAN 46 when the controlling data and detecting data is transmitted, the over occupation of the CAN 46 may cause a congestion of the data and generate an omission of the data. Thus, it is favorable for increasing the credibility of the vehicle radar system 4800. In other embodiments according to the present disclosure (not shown in drawing), a vehicle radar system can includes a front-side radar device, a rear-side radar device or radar device disposed on other position of the vehicle, and a number, detecting direction, features and connecting method of the radar device are not limited by the embodiment according to the present disclosure.

One mode of the radius difference between inner wheels detecting mode, the RCTA mode, the BSD mode and the LCA mode can be activated by the at least one of a turn signal, a rudder signal generated by steering wheel, a velocity signal, an igniting signal, a back signal and a yaw rate signal of the CAN 46 of the vehicle 40.

The radius difference between inner wheels detecting mode of the vehicle radar system 4800 can be triggered or activated by the at least one of the turn signal, the rudder signal and the yaw rate signal. Furthermore, when the vehicle radar system 4800 is at the radius difference between inner wheels detecting mode, the vehicle radar system 4800 can calculate the turning data of the vehicle 40 by the at least one of the turn signal, the rudder signal and the yaw rate signal. The vehicle radar system 4800 can adaptively adjust a alert condition of the vehicle 40 in accordance with the turning data, wherein the alert condition includes a alert area coverage, an object migration velocity and etc., but is not limited thereto. Thus, it is favorable for activating the radius difference between inner wheels detecting mode of the vehicle radar system 4800 in various turning situation, and the alert area will increase or decrease as the different corner of the vehicle 40. In detail, when the vehicle 40 is set or identified traveling in a city or a speed of the vehicle 40 is ranged from 0 km/h to 40 km/h, the radius difference between inner wheels detecting mode of the vehicle radar system 4800 will activated by the at least one of the turn signal, the rudder signal and the yaw rate signal of the vehicle 40. It shows that the driver of the vehicle 40 turns intended or unintended, if the turning action is determined intended, a alert area can be adjusted by a radar rudder data, so as to avoid from an unnecessary alert or misinformation. If the detecting result of the second antenna unit 112 and the related elements of the vehicle radar system 4800 satisfies the alert condition, for example, if there is a moving object or a stationary object in a range more than 30 cm high, the alert unit 42 of the vehicle 40 will produce a alert signal to warn the driver of the vehicle 40. The alert unit 42 can be a speaker, a buzzer, a siren, a monitor, a status indicator, an icon and etc., so as to warn the driver by methods such as voice, light, but is not limited thereto. Moreover, when the radius difference between inner wheels detecting mode of the vehicle radar system 4800 is activated, the BSD mode and the LCA mode can be activated at the same time or only the radius difference between inner wheels detecting mode activated, and the alert signal of the radius difference between inner wheels detecting mode precedes the alert signal of the BSD mode and the LCA mode.

According to the side radar devices 4820, 4830 of the vehicle radar system 4800 applied to the feature of the RCTA of the vehicle 40, the RCTA mode can be triggered or activated when the vehicle radar system 4800 receives the back signal and the velocity signal is less than or equal to 8 km/h. When the at least one of the side radar devices 4820, 4830 detect a vehicle or other object which has a speed of a ranged from 8 km/h to 30 km/h, entering the alert zone, the alert unit 42 is activated and produces the alert signal, wherein the alert zone is a left-rear alert zone and a right-rear alert zone of the vehicle 40. In detail, the left-rear alert zone can be located at the square area intersected by 0.5 m to 10 m left away from the left side 48L and 0 m to 5 m back away from the rear side 49. The right-rear alert zone can be located at the square area intersected by of 0.5 m to 10 m right away from the right side 48R and 0 m to 5 m back away from the rear side 49. Moreover, if the vehicle radar system 4800 receives the back signal and the velocity signal is more than 8 km/h or the RCTA mode is turned off manually, the RCTA mode will not be activated or it will stop activating.

According to the vehicle radar device 100, side radar devices 4810, 4820 and 4830 of the vehicle radar system 4800 applied to the feature of the BSD and the LCA of the vehicle 40, the BSD mode and the LCA mode can be triggered or activated when the vehicle radar system 4800 receives the velocity signal is more than or equal to 20 km/h. When the at least one of the vehicle radar device 100, side radar devices 4810, 4820 and 4830 detects a vehicle or other object has a relative speed less than 30 km/h overtaking from the rear side of the vehicle 40 and entering a detection zone is at the BSD mode. When the at least one of the vehicle radar device 100, side radar devices 4810, 4820 and 4830 detects a vehicle or other object has a relative speed less than 30 km/h overtaking from the left-rear side or the right-rear side of the vehicle 40 and entering the detection zone is at the LCA mode, wherein the detection zone is a square area formed by the width of 0.5 m to 3.25 m left away from the left side 48L, and the length extended backward to the position back away 30 m from the rear side of the vehicle, and a square area formed by the width of 0.5 m to 3.25 m right away from the right side 48R and the length extended backward to the position back away 30 m from the rear side of the vehicle. If the vehicle radar system 4800 does not receive the turn signal of the vehicle 40, then the alert unit 42 is activated to generate a first section alert signal. If the vehicle radar system 4800 receives the turn signal of the vehicle 40 at the same time, then the alert unit 42 is activated to generate a second section alert signal. Therefore, if the vehicle radar system 4800 receives a velocity signal has a speed less than 20 km/h, then the BSD mode and the LCA mode will not be activated or the BSD mode and the LCA mode stop activating.

Moreover, according to the front-side radar device 4710 applied to the features of the FCW and the LDW of the vehicle, when the front-side radar device 4710 detects a distance between the vehicle 40 and the vehicle in front is a safe distance, a status indicator of the alert unit 42 can show in green and it represents the vehicle 40 is in a safe state. When the front-side radar device 4710 detects the distance between the vehicle 40 and the vehicle in front is too close, the status indicator of the alert unit 42 can show in yellow and it represents the vehicle 40 is in a warning state. When the front-side radar device 4710 detects there is a risk of collision, the status indicator of the alert unit 42 can show in a flash red light and it represents the vehicle 40 is in a dangerous state, and the buzzer of the alert unit 42 can generate a warning sound. Furthermore, a photographing unit 44 can identify the lane, when the front-side radar device 4710 detects the vehicle 40 is out of the lane, the front-side radar device 4710 will warn the driver to be careful or take a rest via the alert unit 42.

According to the rear-side radar device 4910 applied to the feature of the RCW of the vehicle 40, when the rear-side radar device 4910 detects a distance between the vehicle 40 and the rear vehicle is a safe distance, a status indicator of the alert unit 42 can show in green and it represents the vehicle 40 is in a safe state. When the rear-side radar device 4910 detects the distance between the vehicle 40 and the rear vehicle is too close, the status indicator of the alert unit 42 can show in yellow and it represents the vehicle 40 is in a warning state. When the rear-side radar device 4910 detects there is a risk of collision, the status indicator of the alert unit 42 can show in a flash red light and it represents the vehicle 40 is in a dangerous state, and the buzzer and the siren of the alert unit 42 both generate a warning sound.

Figure 5:
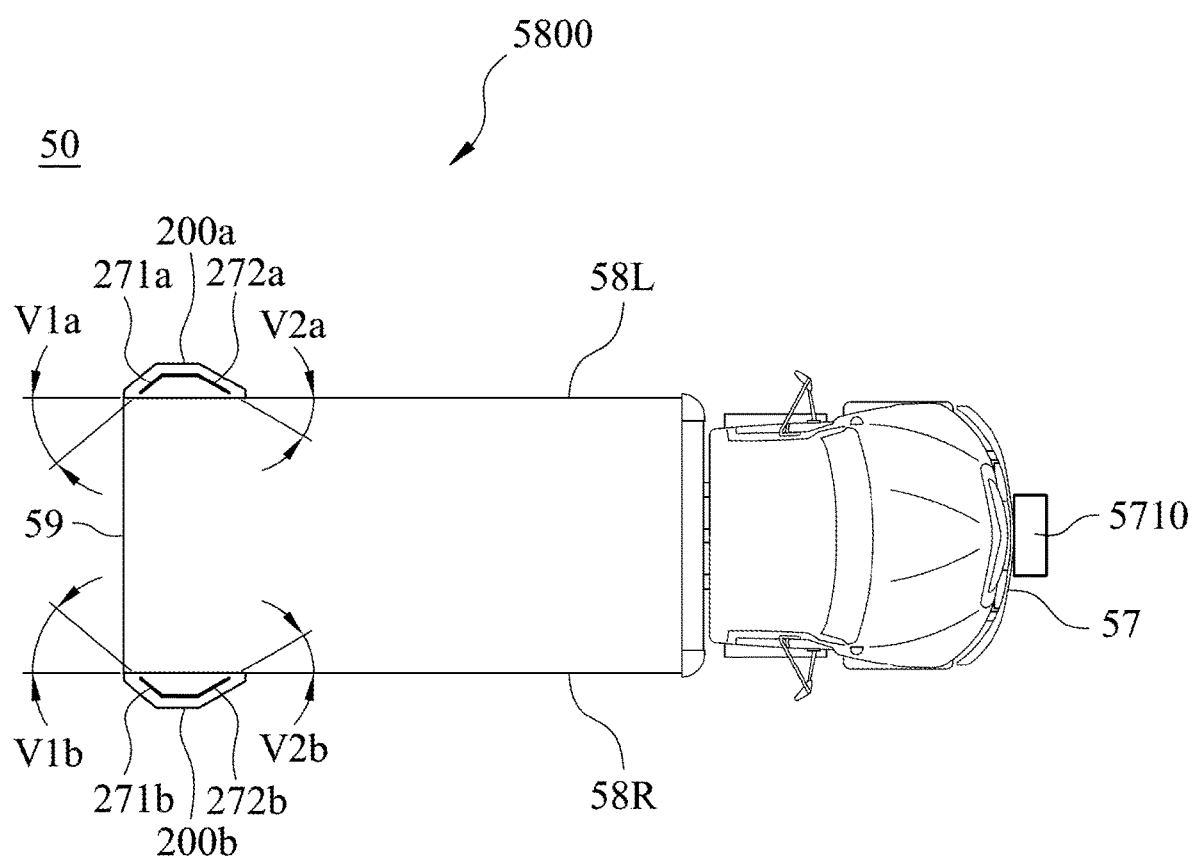
FIG. 5 is a schematic view of a vehicle radar system which is disposed in a vehicle according to the 5th embodiment.

FIG. 5 is a schematic view of the vehicle radar system 5800 which is disposed on the vehicle 50 according to the 5th embodiment (not shown in actual proportion). In FIG. 5, the vehicle radar system 5800 is disposed on the vehicle 50, the vehicle radar system 5800 includes a vehicle radar device 200a and a vehicle radar device 200b. Each of the vehicle radar devices 200a, 200b is disposed on the left side 58L and the right side 58R of the vehicle 50. Except the value of B1 is 40 degrees and the value of B2 is 30 degrees (the position of B1 is closer to the rear side 59 of the vehicle than the position of B2), other characteristics of the vehicle radar devices 200a and 200b may be the same as the corresponding characteristics according to the aforementioned 2nd embodiment. Moreover, the vehicle body of the vehicle 50 includes a front side 57, a left side 58L, a right side 58R and a rear side 59, and the front side 57, the left side 58L, the right side 58R and the rear side 59 form a square in FIG. 5 substantially.

In the 5th embodiment, the vehicle radar device 200a includes a first antenna unit, a second antenna unit, a computing unit and a circuit board. The first antenna unit and the second antenna unit are communicatively connected to the computing unit. The circuit board includes a first board portion 271a and a second board portion 272a. The first antenna unit is a circuit board type and disposed on the first board portion 271a. The second antenna unit is a circuit board type and disposed on the second board portion 272a. The computing unit is disposed on one of the first board portion 271a and the second board portion 272a. The vehicle radar device 200b includes a first antenna unit, a second antenna unit, a computing unit and a circuit board. The first antenna unit and the second antenna unit are communicatively connected to the computing unit. The circuit board includes a first board portion 271b and a second board portion 272b. The first antenna unit is a circuit board type and disposed on the first board portion 271b. The second antenna unit is a circuit board type and disposed on the second board portion 272b. The computing unit is disposed on the one of the first board portion 271b and the second board portion 272b. In the 5th embodiment, P12 of each of the vehicle radar devices 200a and 200b is 110 degrees.

In FIG. 5, an angle between the first board portion 271a and a left side 58L of the vehicle 50 which the vehicle radar device 200a disposed thereon is V1a, an angle between the second board portion 272a and a left side 58L of the vehicle 50 which the vehicle radar device 200a disposed thereon is V2a. An angle between the first board portion 271b and the right side 58R of the vehicle 50 which the vehicle radar device 200b disposed thereon is V1b, an angle between the second board portion 272b and the right side 58R of the vehicle 50 which the vehicle radar device 200b disposed thereon is V2b. Furthermore, the definition of V1a, V1b are identical to the aforementioned V1 in the claim and the detailed description of the present disclosure, the definition of V2a, V2b are identical to the aforementioned V2 in the claim and the detailed description of the present disclosure. In the 5th embodiment, V1a is 40 degrees, V2a is 30 degrees, V1b is 40 degrees and V2b is 30 degrees. Moreover, HT in each of the vehicle radar devices 200a, 200b are both about 28.9 mm.

In the 5th embodiment, each of the first antenna unit of the vehicle radar devices 200a, 200b has a sufficient horizontal beam width (such as AH1 in the 2nd embodiment) and a sufficient vertical beam width (such as AV1 in the 2nd embodiment). Each of the second antenna unit of the vehicle radar devices 200a, 200b has a sufficient horizontal beam width (such as AH2 in the 2nd embodiment) and a sufficient vertical beam width (such as AV2 in the 2nd embodiment). It is favorable for expanding the detecting range in the horizontal plane and the vertical plane at the same time of the vehicle radar system 5800.

The length of the vehicle 50 is ranged from 4 m to 8 m, a number of the vehicle radar device of the vehicle radar system 5800 is two (that is, the vehicle radar devices 200a, 200b), wherein the vehicle radar device 200a is disposed on the left side 58L of the vehicle 50 and near the rear side 59 of the vehicle 50 (that is, near or located on the left-rear corner of the vehicle 50), the vehicle radar device 200b is disposed on the right side 58R of the vehicle 50 and near the rear side 59 of the vehicle 50 (that is, near or located on the right-rear corner of the vehicle). Thus, if the vehicle 50 is a truck, especially a truck like logistics vehicle, the features of the radius difference between inner wheels detection, the RCTA, the BSD and the door open warning (DOW) can be achieved. In the 5th embodiment, the vehicle 50 is a logistics vehicle, and the length is 6 m.

One of the vehicle radar devices 200a, 200b is communicatively connected to a vehicle control unit (not shown in drawings) of the vehicle 50 via the other one of the vehicle radar devices 200a, 200b. Thus, it is favorable for increasing the communicative efficiency of the vehicle radar system 5800 and the unit of the vehicle 50, such as control unit. In detail, the vehicle radar device 200a is communicatively connected to the vehicle radar device 200b via the private CAN, and then the regular one of the vehicle radar devices 200a, 200b or one of the above decided by algorithm will be a master radar device of the vehicle radar system 5800 so as to transfer the detecting data of the vehicle radar devices 200a, 200b to other units of the vehicle.

In detail, the operating frequency of the vehicle radar devices 200a, 200b are both about 79 GHz. According to the present disclosure, the vehicle radar system 5800 can achieve the features of the radius difference between inner wheels detection, the RCTA, the BSD and the DOW via the vehicle radar devices 200a, 200b included in the vehicle radar system 5800. Furthermore, the second antenna unit and the related elements of the second board portion 272a (an angle V2a between the second board portion 272a and the left side 58L is 30 degrees) of the vehicle radar device 200a can provide a detecting data of the left of the front part of the vehicle 50, the second antenna unit and the related elements on the second board portion 272b (an angle V2b between the second board portion 272b and the right side 58R is 30 degrees) can provide a detecting data of the right of the front part of the vehicle 50, and used for the features of the radius difference between inner wheels detection of the vehicle 50. The first antenna unit and the related elements of the first board portion 271a (an angle V1a between the first board portion 271a and the left side 58L is 40 degrees) of the vehicle radar device 200a can provide a detecting data of the left of the rear part and the rear part of the vehicle 50, the first board portion 271b (an angle V1b between the first board portion 271b and the right side 58R is 40 degrees) of the vehicle radar device 200b can provide a detecting data of the right of the rear part and the rear part of the vehicle 50, and used for the features of the RCTA and the DOW. The vehicle radar devices 200a, 200b can provide the detecting data of the left side, the right side, the left of the rear part, the right of the rear part and the rear side, and used for the features of the BSD. Moreover, the application of the vehicle radar system 5800 and the vehicle radar devices 200a, 200b are not limited in the aforementioned features.

In FIG. 5, with respect to the feature of detecting the object out of the vehicle 50, the vehicle 50 includes a vehicle radar system 5800 and a front-side radar device 5710. The operating frequency of the front-side radar device 5710 is about 77 GHz and the front-side radar device 5710 is disposed on the front side 57 of the vehicle 50, it can provide a detecting data of a front side of the vehicle 50 and used for the features of the FCW and the LDW of the vehicle 50.

According to the vehicle radar system 5800 and the front side radar device 5710 applied to the vehicle 50 of the features of the radius difference between inner wheels detection, the RCTA, the BSD, the FCW and the LDW is similar to the aforementioned 4th embodiment, and will not be described in the 5th embodiment again.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A vehicle radar device, comprising:
   a first antenna unit;
   a second antenna unit;
   at least one computing unit, the first antenna unit and the second antenna unit communicatively connected to the at least one computing unit;
   at least one circuit board, comprising a first board portion and a second board portion, wherein the first antenna unit is a circuit board type and is disposed on the first board portion, the second antenna unit is a circuit board type and is disposed on the second board portion, and the at least one computing unit is disposed on at least one of the first board portion and the second board portion; and
   a housing, wherein the first antenna unit, the second antenna unit, the at least one computing unit and the at least one circuit board are disposed in the housing, the housing comprises a bottom and two covering members;

wherein an angle between the first board portion and an outer surface of the bottom is B1, an angle between the second board portion and the outer surface of the bottom is B2, a thickness from an outer surface of the bottom of the vehicle radar device is HT, thicknesses of the two covering members are the same, the first board portion is parallel to one of the two covering members and a distance therebetween is S1, the second board portion is parallel to the other one of the two covering members and a distance therebetween is S2, and the following conditions are satisfied:

25 degrees≤B1≤50 degrees;
25 degrees≤B2≤50 degrees;
15 mm≤HT≤50 mm;
0 mm≤S1≤5 mm; and
0 mm≤S2≤5 mm.

2. The vehicle radar device of claim 1, further comprising:
at least one floor lamp, illuminating outwardly from the two covering members of the housing.

3. The vehicle radar device of claim 1, wherein a number of the at least one computing unit is two, the first antenna unit and the second antenna unit are communicatively connected to the two computing units, respectively, and the two computing units are disposed on the first board portion and the second board portion, respectively.

4. The vehicle radar device of claim 1, wherein a number of the at least one circuit board is one, the first board portion and the second board portion are disposed on the circuit board.

5. The vehicle radar device of claim 1, wherein a number of the at least one circuit board is two, the first board portion and the second board portion are disposed on the two circuit boards, respectively.

6. The vehicle radar device of claim 1, wherein an operating frequency of the first antenna unit and an operating frequency of the second antenna unit are both greater than 10 GHz, the first antenna unit comprises at least one first transmitting antenna and at least one first receiving antenna, the second antenna unit comprises at least one second transmitting antenna and at least one second receiving antenna.

7. The vehicle radar device of claim 6, wherein the first antenna unit comprises at least two first receiving antennas, the at least two first receiving antennas are at least two antenna types, respectively, and the second antenna unit comprises at least two second receiving antennas, the at least two second receiving antennas are at least two antenna types, respectively.

8. The vehicle radar device of claim 6, wherein at least one of the first transmitting antenna, the first receiving antenna, the second transmitting antenna and the second receiving antenna comprises a meander line antenna.

9. The vehicle radar device of claim 6, wherein at least one of the first transmitting antenna, the first receiving antenna, the second transmitting antenna and the second receiving antenna comprises a patch antenna.

10. The vehicle radar device of claim 1, wherein an angle between a centerline of a main lobe of the first antenna unit on a plane and a centerline of a main lobe of the second antenna unit on the plane is A12, and the plane is vertical to the first board portion and the second board portion, and the following condition is satisfied:

50 degrees≤A12≤100 degrees.

11. The vehicle radar device of claim 1, wherein a half power beam width of a main lobe of the first antenna unit on a plane is AH1, a half power beam width of a main lobe of the second antenna unit on the plane is AH2, and the plane is vertical to the first board portion and the second board portion, and the following conditions are satisfied:

100 degrees≤AH1<180 degrees; and
100 degrees≤AH2<180 degrees.

12. The vehicle radar device of claim 11, wherein a half power beam width of a main lobe of the first antenna unit in another plane is AV1, and the another plane is vertical to the plane and the first board portion, a half power beam width of a main lobe of the second antenna unit on further another plane is AV2, and the further another plane is vertical to the plane and the second board portion, and the following conditions are satisfied:

100 degrees≤AV1<180 degrees; and
100 degrees≤AV2<180 degrees.

13. A vehicle radar system, disposed in a vehicle, the vehicle radar system comprising: at least one vehicle radar device, wherein the at least one vehicle radar device is disposed on at least one side of a left side and a right side of the vehicle, and the vehicle radar device comprises:
a first antenna unit;
a second antenna unit;
at least one computing unit, the first antenna unit and the second antenna unit communicatively connected to the at least one computing unit;
at least one circuit board, comprising a first board portion and a second board portion, wherein the first board portion and the second board portion are vertical to a horizontal plane of the vehicle, the first antenna unit is a circuit board type and is disposed on the first board portion, the second antenna unit is a circuit board type and is disposed on the second board portion, the at least one computing unit is disposed on at least one of the first board portion and the second board portion; and
a housing, wherein the first antenna unit, the second antenna unit, the at least one computing unit and the at least one circuit board are disposed in the housing, the housing comprises a bottom, an outer surface of the bottom is parallel to the side of the vehicle which is the vehicle radar device disposed thereon;
wherein a radius difference between inner wheels detecting mode of the vehicle is activated via at least one of a turn signal, a rudder angle signal and a yaw rate signal of the vehicle, the vehicle radar system calculates a turning data of the vehicle via the at least one of the turn signal, the rudder angle signal and the yaw rate signal when the vehicle radar system is at the radius difference between inner wheels detecting mode, the vehicle radar system adaptively adjusts an alert condition of the vehicle in accordance with the turning data;
wherein an angle between the first board portion and the side of the vehicle which the vehicle radar device disposed thereon is V1, an angle between the second board portion and the side of the vehicle which the vehicle radar device disposed thereon is V2, a thickness from an outer surface of the bottom of the vehicle radar device is HT, and the following conditions are satisfied:
25 degrees≤V1≤50 degrees;
25 degrees≤V2≤50 degrees; and
15 mm≤HT≤50 mm.

14. The vehicle radar system of claim 13, wherein a length of the vehicle is ranged from 10 m to 18 m, a number of the at least one vehicle radar device is one, and the vehicle radar device is disposed on the left side or the right side of the vehicle.

15. The vehicle radar system of claim 14, further comprising:
   at least one side radar device disposed on at least one side of the left side and the right side of the vehicle, one of the side radar device and the vehicle radar device is communicatively connected to a vehicle control unit of the vehicle via the other one of the side radar device and the vehicle radar device.

16. The vehicle radar system of claim 13, wherein a length of the vehicle is ranged from 4 m to 8 m, a number of the at least one vehicle radar device is two, and one of the two vehicle radar devices is disposed on the left side of the vehicle and is near a rear side of the vehicle, the other one of the two vehicle radar devices is disposed on the right side of the vehicle and is near the rear side of the vehicle.

17. The vehicle radar system of claim 16, wherein one of the two vehicle radar devices is communicatively connected to a vehicle control unit of the vehicle via the other one of the two vehicle radar devices.

* * * * *